US008127056B2

(12) United States Patent
Honda

(10) Patent No.: US 8,127,056 B2
(45) **Date of Patent: *Feb. 28, 2012**

(54) DATA TRANSFER CONTROL DEVICE INCLUDING A SWITCH CIRCUIT THAT SWITCHES WRITE DESTINATION OF RECEIVED PACKETS

(75) Inventor: Hiroyasu Honda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 595 days.

This patent is subject to a terminal disclaimer.

(21) Appl. No.: 12/292,883

(22) Filed: Nov. 28, 2008

(65) Prior Publication Data

US 2009/0094390 A1 Apr. 9, 2009

Related U.S. Application Data

(63) Continuation of application No. 11/378,466, filed on Mar. 20, 2006, now Pat. No. 7,475,171.

(30) Foreign Application Priority Data

Mar. 23, 2005 (JP) ................................ 2005-083540

(51) Int. Cl.
*G06F 3/00* (2006.01)
*H04L 12/56* (2006.01)

(52) U.S. Cl. ................ 710/52; 710/53; 710/62; 710/71; 710/302; 345/98; 345/204

(58) Field of Classification Search .................... 710/52, 710/53, 62, 71, 302; 345/98, 204
See application file for complete search history.

(56) References Cited

U.S. PATENT DOCUMENTS

| | | | | |
|---|---|---|---|---|
| 5,446,496 | A | 8/1995 | Foster et al. | |
| 6,363,085 | B1 | 3/2002 | Samuels | |
| 6,771,670 | B1 | 8/2004 | Pfahler et al. | |
| 7,050,032 | B2 * | 5/2006 | Tamura | 345/98 |
| 7,334,132 | B1 | 2/2008 | Kumar et al. | |
| 7,600,061 | B2 * | 10/2009 | Honda | 710/71 |
| 7,617,347 | B2 * | 11/2009 | Honda | 710/305 |
| 7,693,086 | B2 * | 4/2010 | Honda | 370/252 |
| 2002/0011998 | A1 | 1/2002 | Tamura | |
| 2002/0180676 | A1 | 12/2002 | Lee | |
| 2004/0036684 | A1 | 2/2004 | Kasai | |
| 2006/0215703 | A1 | 9/2006 | Honda | |
| 2006/0227709 | A1 | 10/2006 | Honda | |
| 2006/0227710 | A1 | 10/2006 | Honda | |

FOREIGN PATENT DOCUMENTS

| | | | |
|---|---|---|---|
| EP | 1 089 473 | A1 | 4/2001 |
| EP | 1 164 570 | A1 | 12/2001 |

(Continued)

*Primary Examiner* — Tammara Peyton
(74) *Attorney, Agent, or Firm* — Oliff & Berridge, PLC

(57) ABSTRACT

A data transfer control device including: a link controller which analyzes a packet received through a serial bus; a packet detection circuit which detects completion or start of packet reception based on analysis result of the received packet; first and second packet buffers into which the packet received through the serial bus is written; and a switch circuit which switches a write destination of the received packet. When a Kth packet has been written into one of the first and second packet buffers and completion of reception of the Kth packet or start of reception of a (K+1)th packet subsequent to the Kth packet has been detected, the switch circuit switching the write destination of the (K+1)th packet to the other of the first and second packet buffers.

8 Claims, 20 Drawing Sheets

FOREIGN PATENT DOCUMENTS

| | | | |
|---|---|---|---|
| EP | 1 369 843 | A2 | 12/2003 |
| JP | A-11-161466 | | 6/1999 |
| JP | A-11-331277 | | 11/1999 |
| JP | A 2001-222249 | | 8/2001 |

* cited by examiner

FIG.2A WRITE REQUEST PACKET
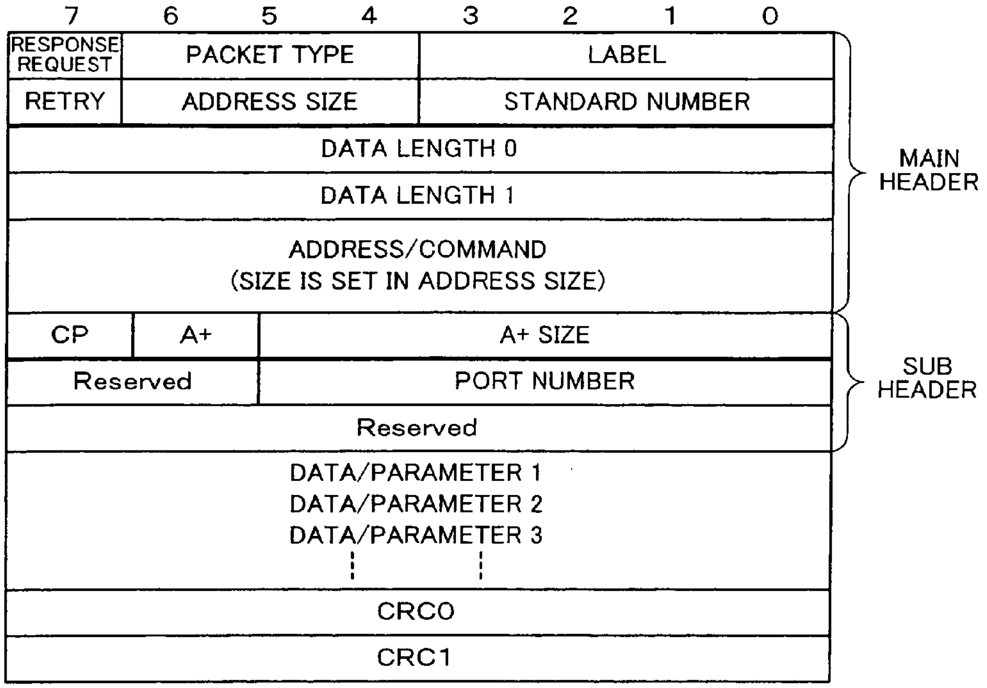
FIG.2B READ REQUEST PACKET
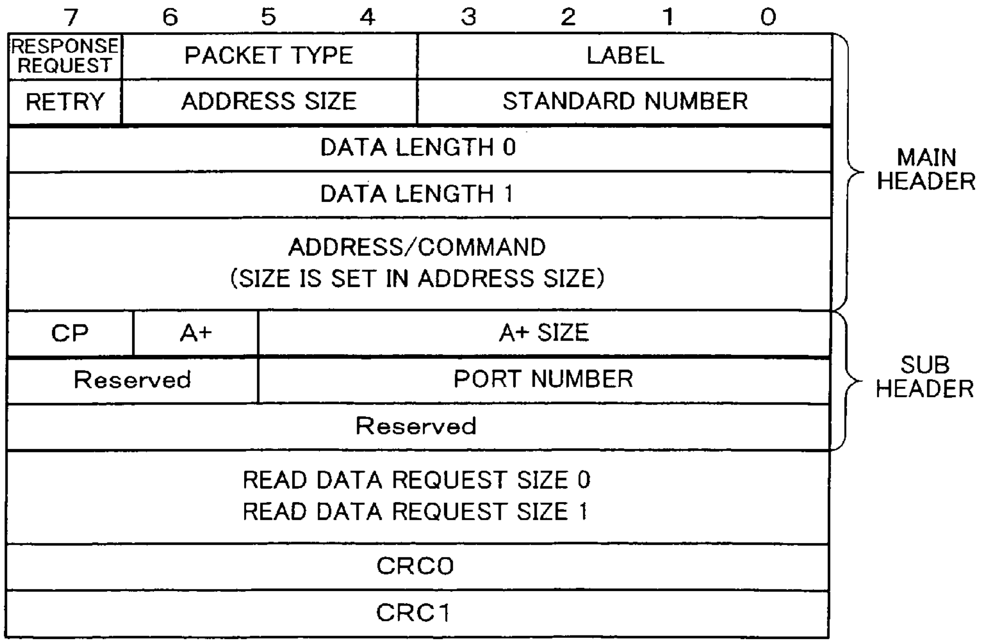

FIG.3A RESPONSE PACKET
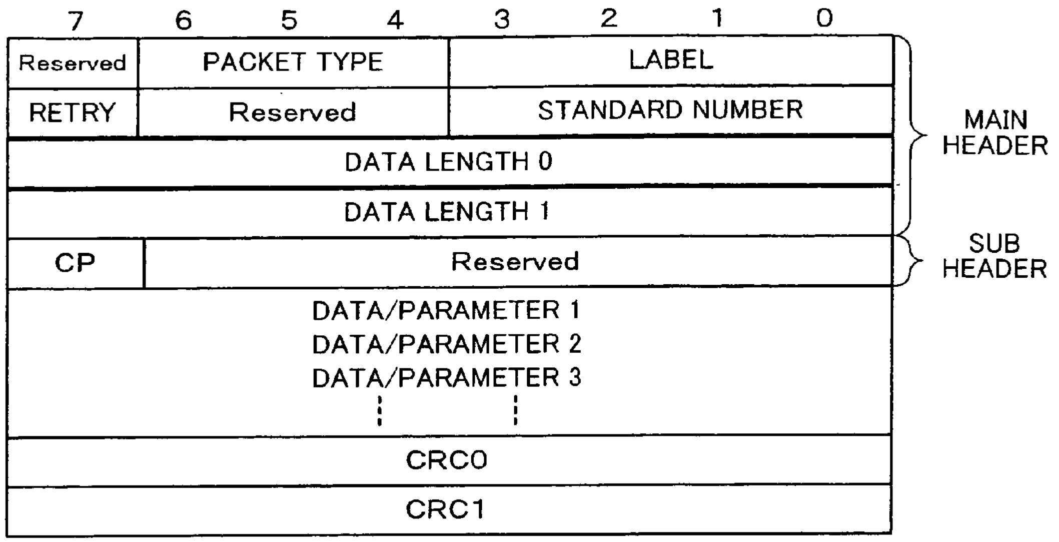
FIG.3B ACKNOWLEDGE PACKET
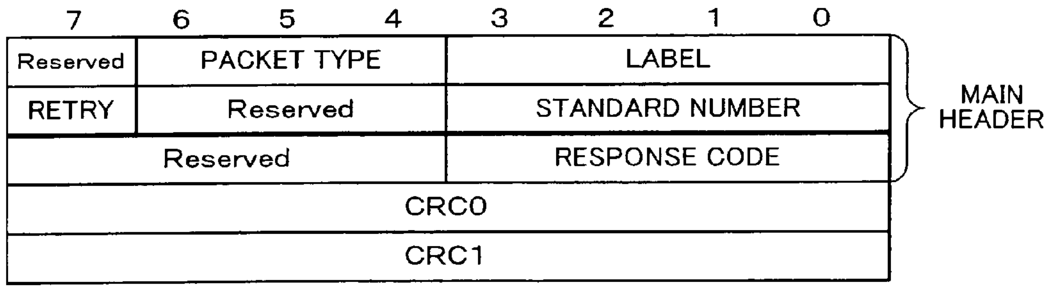

DATA TRANSFER CONTROL DEVICE INCLUDING A SWITCH CIRCUIT THAT SWITCHES WRITE DESTINATION OF RECEIVED PACKETS

This is a Continuation of application Ser. No. 11/378,466 filed Mar. 20, 2006, which claims priority from Japanese Patent Application No. 2005-83540, filed on Mar. 23, 2005, the disclosures of which are hereby incorporated herein by reference in their entireties

BACKGROUND OF THE INVENTION

The present invention relates to a data transfer control device and an electronic instrument.

In recent years, a high-speed serial transfer interface such as a low voltage differential signaling (LVDS) interface has attracted attention as an interface aiming at reducing EMI noise or the like. In such a high-speed serial transfer, data is transferred by causing a transmitter circuit to transmit serialized data using differential signals and causing a receiver circuit to differentially amplify the differential signals (JP-A-2001-222249).

An ordinary portable telephone includes a first instrument section provided with buttons for inputting a telephone number or a character, a second instrument section provided with a main liquid crystal display (LCD), a sub LCD, or a camera, and a connection section (e.g. hinge) which connects the first and second instrument sections. Therefore, the number of interconnects passing through the connection section can be reduced by transferring data between a first substrate of the first instrument section and a second substrate of the second instrument section by serial transfer using differential signals.

It is desirable that the transfer efficiency be high when transferring data through the connection section by serial transfer. In particular, when displaying a motion picture on the LCD, it is desirable that packets from a host (first instrument section) be continuously transmitted to a target (second instrument section).

A display driver which drives a display panel such as an LCD may generate a vertical synchronization signal (VCIN) for indicating a non-display period of the display panel. For example, a display driver including a RAM controls switching between the non-display period and the display period of the display panel. Therefore, since the display driver must notify the host of the non-display period of the display panel, the display driver outputs the vertical synchronization signal to the host. Therefore, when realizing data transfer through the connection section between the first and second instrument sections by serial transfer, it is important to efficiently transmit the vertical synchronization signal output from the display driver to the host.

SUMMARY

According to a first aspect of the invention, there is provided a data transfer control device which controls data transfer, the data transfer control device comprising:

a link controller which analyzes a packet received through a serial bus;

a packet detection circuit which detects completion or start of packet reception based on analysis result of the received packet;

first and second packet buffers into which the packet received through the serial bus is written; and a switch circuit which switches a write destination of the received packet, when a Kth packet has been written into one of the first and second packet buffers and completion of reception of the Kth packet or start of reception of a (K+1)th packet subsequent to the Kth packet has been detected, the switch circuit switching the write destination of the (K+1)th packet to the other of the first and second packet buffers.

According to a second aspect of the invention, there is provided an electronic instrument comprising:

the above-described data transfer control device; and a display driver connected to the data transfer control device through an interface bus.

BRIEF DESCRIPTION OF THE SEVERAL VIEWS OF THE DRAWING

FIGS. 2A and 2B show packet format examples.

FIGS. 3A and 3B show packet format examples.

DETAILED DESCRIPTION OF THE EMBODIMENT

Figure 1:
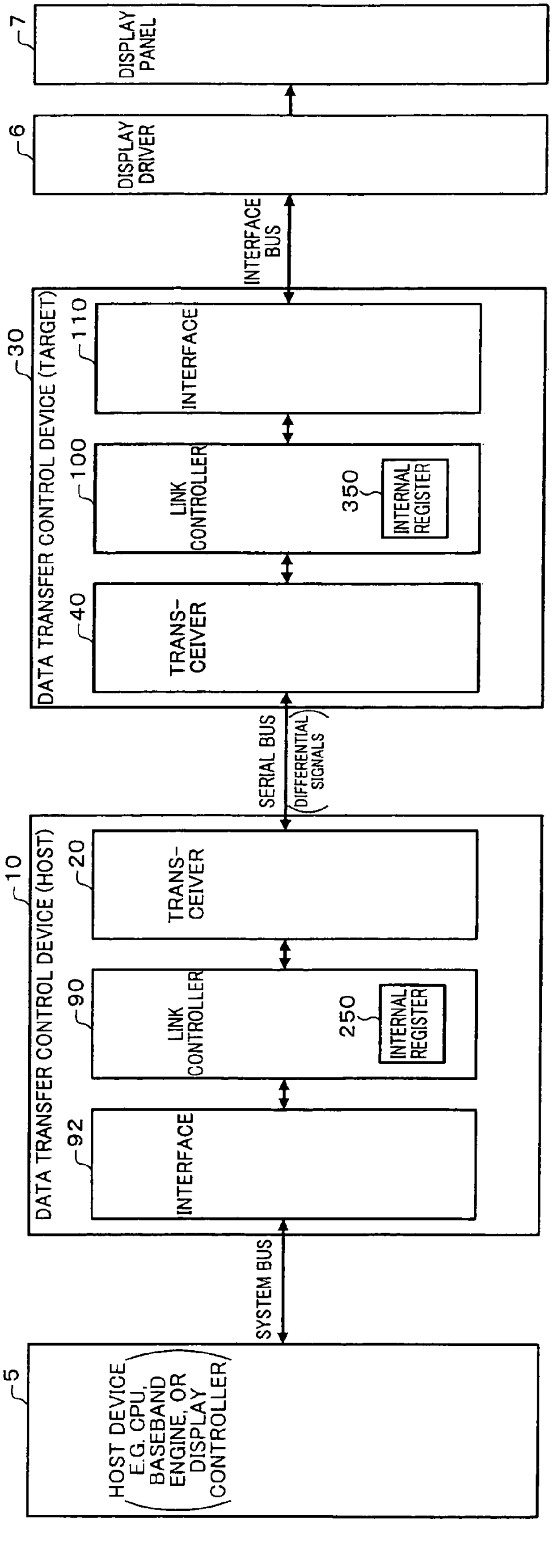
FIG. 1 shows a data transfer control device according to one embodiment of the invention and a system configuration example of the data transfer control device.

The invention may provide a data transfer control device which can increase the serial transfer efficiency and an electronic instrument including the same.

According to one embodiment of the invention, there is provided a data transfer control device which controls data transfer, the data transfer control device comprising:

a link controller which analyzes a packet received through a serial bus;

a packet detection circuit which detects completion or start of packet reception based on analysis result of the received packet;

first and second packet buffers into which the packet received through the serial bus is written; and a switch circuit which switches a write destination of the received packet, when a Kth packet has been written into one of the first and second packet buffers and completion of reception of the Kth packet packet or start of reception of a (K+1)th packet subsequent to the Kth packet has been detected, the switch circuit switching the write destination of the (K+1)th packet to the other of the first and second packet buffers.

In this embodiment, when the Kth packet has been written into the first packet buffer and completion of reception of the Kth packet or start of reception of the subsequent (K+1)th packet has been detected, the write destination of the (K+1)th packet is switched from the first packet buffer to the second packet buffer. Therefore, since the partner device (host) need not wait for the packet buffer to become empty, the partner device can continuously transmit packets. This enables a continuous packet transfer such as stream transfer to be realized, whereby the serial transfer efficiency can be increased.

In this data transfer control device, when the packet received through the serial bus is a read request packet, the link controller may set the first packet buffer as a reception packet buffer and set the second packet buffer as a transmission packet buffer; and when the packet received through the serial bus is a write request packet, the link controller may set the first and second packet buffers as reception packet buffers between which the write destination is switched by the switch circuit.

This allows the first and second packet buffers to be set as a single buffer configuration or a double buffer configuration depending on the type of request packet. Therefore, the data transfer efficiency can be increased without increasing the circuit scale to a large extent.

In this data transfer control device, the write request packet may include a response request field used for indicating whether or not to perform handshake transfer using an acknowledge packet; and when the packet received through the serial bus is the write request packet and a response request value "response not requested" is set in the response request field, the link controller may set the first and second packet buffers as the reception packet buffers between which the write destination is switched by the switch circuit.

This makes a response request using an acknowledge packet unnecessary and realizes packet transfer using a double buffer configuration, whereby the data transfer efficiency can be further increased.

The data transfer control device may comprise:

an interface circuit which performs interface processing between the data transfer control device and a display driver connected to the data transfer control device through an interface bus; and a signal detection circuit which detects a vertical synchronization signal used for indicating a non-display period of a display panel and outputs a detection signal when the vertical synchronization signal has been input from the display driver, wherein, when the link controller has received a read request packet which request reading of status of the vertical synchronization signal, the link controller may set the first packet buffer as a reception packet buffer and set the second packet buffer as a transmission packet buffer, wait for the detection signal to be output from the signal detection circuit, and, on condition that the detection signal has been output from the signal detection circuit, read a response packet or an acknowledge packet for the read request packet from the second packet buffer set as the transmission packet buffer and transmit the response packet or the acknowledge packet through the serial bus.

This enables the partner device (host) to be efficiently notified of the status of the vertical synchronization signal output from the display driver. The partner device need not monitor detection of the vertical synchronization signal for a period until the response packet or the acknowledge packet is transmitted to the partner device after the partner device has transmitted the read request packet. Therefore, since the partner device can perform another processing in this period, the performance of the entire system can be improved.

In this data transfer control device, when the link controller has received the read request packet, the link controller may generate the response packet or the acknowledge packet for the read request packet, write the generated response packet or acknowledge packet into the second packet buffer set as the transmission packet buffer, and, on condition that the detection signal has been output from the signal detection circuit, read the response packet or the acknowledge packet written into the second packet buffer from the second packet buffer and transmit the response packet or the acknowledge packet through the serial bus.

This reduces a time lag from detection of the vertical synchronization signal to transmission of the response packet or the acknowledge packet, whereby the partner device can be notified that the display panel is in the non-display period within a short time.

In this data transfer control device, when the link controller has received a write request packet which requests writing of a command or data after the response packet or the acknowledge packet has been transmitted through the serial bus, the link controller may set the first and second packet buffers as the reception packet buffers between which the write destination is switched by the switch circuit, and output the command or the data for which writing has been requested to the interface circuit through one of the first and second packet buffers; and the interface circuit may output the command or the data from the link controller to the display driver through the interface bus.

This enables the command or data from the partner device to be transferred to the display driver in the non-display period of the display panel. Therefore, the display operation of the display panel can be prevented from being adversely affected by writing of the command or data.

In this data transfer control device, the write request packet may include a response request field used for indicating whether or not to perform handshake transfer using an acknowledge packet, a response request value "response not requested" being set in the response request field; and when the link controller has received the write request packet in which a response request value "response not requested" is set, the link controller may output the command or the data for which writing has been requested to the interface circuit without directing transmission of the acknowledge packet for the write request packet.

According to this feature, even if the non-display period of the display panel is short, the command or data can be appropriately transferred to the display driver within such a short time.

The data transfer control device may comprise:

an edge setting register which is used for setting whether to detect a rising edge or a falling edge of the vertical synchronization signal, wherein the signal detection circuit may output the detection signal on condition that the rising edge of the vertical synchronization signal has been detected when "rising edge detection" has been set in the edge setting register, and output the detection signal on condition that the falling edge of the vertical synchronization signal has been detected when "falling edge detection" has been set in the edge setting register.

This makes it possible to deal with various display drivers which differ in the signal form of the vertical synchronization signal.

The data transfer control device may comprise:

a read register used for reading the status of the vertical synchronization signal, wherein the read request packet which requests reading of the status of the vertical synchronization signal may be a packet which requests reading from the read register.

This implements processing of waiting for detection of the vertical synchronization signal and then transmitting the response packet or the acknowledge packet without providing a special register or the like.

In this data transfer control device, the interface circuit may be an MPU interface circuit which generates an MPU interface signal.

In this data transfer control device, the packet detection circuit may detect completion of reception of a packet based on a data length set in a header of the packet.

The data transfer control device may comprise:

a transceiver which uses differential signal lines of the serial bus, and transmits and receives a packet to and from a host-side data transfer control device.

According to one embodiment of the invention, there is provided an electronic instrument comprising:

the above-described data transfer control device; and a display driver connected to the data transfer control device through an interface bus.

These embodiments of the invention will be described in detail below, with reference to the drawings. Note that the embodiments described below do not in any way limit the scope of the invention laid out in the claims herein. In addition, not all of the elements of the embodiments described below should be taken as essential requirements of the invention.

1. System Configuration

FIG. 1 shows a data transfer control device (data transfer control circuit) according to one embodiment of the invention and a system configuration example of the data transfer control device. In one embodiment of the invention, a bridge function between a system bus and an interface bus is realized by using host-side and target-side data transfer control devices 10 and 30 as shown in FIG. 1.

The configuration of the data transfer control devices 10 and 30 is not limited to the configuration shown in FIG. 1. Some of the circuit blocks shown in FIG. 1 may be omitted, or the configuration of the connection between the circuit blocks may be changed, or a circuit block differing from those shown in FIG. 1 may be additionally provided. For example, a transceiver 20 may be omitted from the host-side data transfer control device 10, or a transceiver 40 may be omitted from the target-side data transfer control device 30. The data transfer control device 30 and a display driver 6 may be formed by two chips (semiconductor chips), or may be formed by one chip. For example, when using the data transfer control device 30 as an intellectual property (IP) core, the data transfer control device 30 may be provided in the semiconductor chip of the display driver 6. Likewise, a host device 5 (system device) and the data transfer control device 10 may be formed by one chip.

The host (TX) side data transfer control device 10 and the target (RX) side data transfer control device 30 transfer packets through a serial bus using differential signals. In more detail, the data transfer control devices 10 and 30 transmit and receive packets by current-driving or voltage-driving differential signal lines of the serial bus.

The host-side data transfer control device 10 includes an interface circuit 92 which performs interface processing between the data transfer control device 10 and the host device 5 (e.g. CPU, baseband engine, or display controller). The interface circuit 92 is connected with the host device 5 through a system bus (host bus). The system bus may be used as an RGB interface bus or a micro processor unit (MPU) interface bus. When using the system bus as an RGB interface bus, the system bus may include signal lines for a horizontal synchronization signal, vertical synchronization signal, clock signal, data signal, and the like. When using the system bus as an MPU interface bus, the system bus may include signal lines for a data signal, read signal, write signal, address 0 signal (command/parameter identification signal), chip select signal, and the like.

The host-side data transfer control device 10 includes a link controller 90 (link layer circuit) which performs link layer processing. The link controller 90 generates a packet (e.g. request packet or stream packet) transferred to the target-side data transfer control device 30 through the serial bus (LVDS), and transmits the generated packet. In more detail, the link controller 90 initiates a transmission transaction and directs the transceiver 20 to transmit the generated packet.

The host-side data transfer control device 10 includes the transceiver 20 (PHY) which performs physical layer processing or the like. The transceiver 20 transmits a packet indicated by the link controller 90 to the target-side data transfer control device 30 through the serial bus. The transceiver 20 also receives a packet from the target-side data transfer control device 30. In this case, the link controller 90 analyzes the received packet and performs link layer (transaction layer) processing.

The target-side data transfer control device 30 includes the transceiver 40 (PHY) which performs physical layer processing or the like. The transceiver 40 receives a packet from the host-side data transfer control device 10 through the serial bus. The transceiver 40 also transmits a packet to the host-side data transfer control device 10. In this case, a link controller 100 generates a packet transmitted to the host-side data transfer control device 10, and directs the transceiver 40 to transmit the generated packet.

The target-side data transfer control device 30 includes the link controller 100 (link layer circuit). The link controller 100 performs link layer (transaction layer) processing including receiving a packet from the host-side data transfer control device 10 and analyzing the received packet.

The target-side data transfer control device 30 includes an interface circuit 110 which performs interface processing between the data transfer control device 30 and the display driver 6 (display driver circuit) which drives a display panel 7 (e.g. LCD). The interface circuit 110 generates various interface signals and outputs the generated interface signals to the interface bus. The interface circuit 110 may include an RGB interface circuit, an MPU interface circuit, and a serial interface circuit (first to Nth interface circuits in a broad sense). The interface circuit 110 may perform interface processing between the data transfer control device 30 and a camera device or a sub LCD.

When the host (host device 5) side system bus is used as an RGB interface bus, the target (display driver 6) side interface bus is also used as an RGB interface bus. The interface circuit 110 (RGB interface circuit) generates an RGB interface signal, and outputs the generated RGB interface signal to the display driver 6 (device in a broad sense). When the host-side system bus is used as an MPU interface bus, the target-side interface bus is also used as an MPU interface bus. The interface circuit 110 (MPU interface circuit) generates an MPU interface signal, and outputs the generated MPU interface signal to the display driver 6. The host-side and target-side interface buses may differ in interface type. For example, the host-side system bus may be set as an RGB interface bus, and the target-side interface bus may be set as an MPU interface bus. Or, the host-side system bus may be set as an MPU interface bus, and the target-side interface bus may be set as an RGB interface bus.

In this embodiment, a bridge function between the host-side system bus and the target-side interface bus is implemented by providing the above-described interface circuits 92 and 110. Specifically, when the system bus is used as an RGB interface bus, an RGB interface signal output from the host device 5 is transmitted to the target by packet transfer through the serial bus using the differential signals. The target-side interface circuit 110 outputs an RGB interface signal corresponding to the RGB interface signal from the host to the display driver 6. When the system bus is used as an MPU interface bus, an MPU interface signal output from the host device 5 is transmitted to the target by packet transfer through the serial bus using the differential signals. The target-side interface circuit 110 outputs an MPU interface signal corresponding to the MPU interface signal from the host to the display driver 6.

In more detail, an internal register 350 of the target-side data transfer control device 30 stores interface information for specifying the signal form (output format) of the interface signal output from the interface circuit 110 or the like. Specifically, the internal register 350 stores timing information for specifying the change timing of the signal level of the interface signal or the like. In this case, information stored in an internal register 250 of the host-side data transfer control device 10 and necessary for the target is transferred to the target through the serial bus and is written into the target-side internal register 350. Specifically, the target-side internal register 350 is a subset (shadow register) of the host-side internal register 250. The interface circuit 110 generates an interface signal (interface control signal or data signal), of which the signal level changes at a timing according to the timing information set in the target-side internal register 350, based on the timing information, and outputs the generated interface signal.

Specifically, the host device 5 sets the timing information of the interface signal in the host-side internal register 250 as an initial setting before transferring data. The host device 5 directs start of register transfer using a register transfer start register included in the host-side internal register 250. Then, the timing information of the interface signal written into the host-side internal register 250 is packet-transferred from the host-side data transfer control device 10 to the target-side data transfer control device 30 through the serial bus. The transferred timing information is written into the target-side internal register 350.

After the above-described initial setting, the host device 5 writes data (command or parameter) into a port write register of the host-side internal register 250. Then, a packet in which data is set in a data field is transmitted from the host-side data transfer control device 10 to the target-side data transfer control device 30 through the serial bus. The interface circuit 110 outputs an interface signal including a signal of data set in the packet to the interface bus at the timing according to a timing information set in the target-side internal register 350.

The following description provides the configuration and the operation according to one embodiment of the invention when the host-side data transfer control device 10 transmits a request packet to the target-side data transfer control device 30 for convenience of description. The same description also applies to the configuration and the operation when the target-side data transfer control device 30 transmits a request packet to the host-side data transfer control device 10.

2. Packet Format

FIGS. 2A to 3B show format examples of packets transferred by the data transfer control device according to one embodiment of the invention. The field configuration and the field arrangement of each packet are not limited to those of the examples shown in FIGS. 2A to 3B. Various modifications and variations may be made. Specifically, some of these fields may be omitted, or another field may be provided.

A write request packet shown in FIG. 2A is a packet for requesting writing of data (command). The write request packet includes a response request field, a packet type field, a label field, a retry field, an address size field, a standard number field, a data length field, and an address/command field. The write request packet also includes a CP field, an A+ field, an A+ size field, a port number field, a data/parameter field, and a cyclic redundancy check (CRC) field.

A read request packet shown in FIG. 2B is a packet for requesting reading of data. The read request packet is the same as the write request packet shown in FIG. 2A except that the read request packet includes a read data request size field instead of the data/parameter field of the write request packet.

A response packet shown in FIG. 3A is a packet for sending a response to the read request packet shown in FIG. 2B. In the response packet, a data/parameter sent as a response is set (inserted) in a data/parameter field.

An acknowledge packet (handshake packet) shown in FIG. 3B is a packet for transmitting acknowledgement (ACK) or negative acknowledgement (NACK). The acknowledge packet does not include a data/parameter field.

The response request field included in the request packet (write request packet or read request packet) is a field for indicating whether or not to perform handshake transfer using the acknowledge packet (ACK or NACK). For example, the response request field indicates that the acknowledge packet is unnecessary when a response request value (response request flag) set in the response request field is "0", and indicates that the acknowledge packet is necessary when the response request value is "1".

The packet type field is a field for indicating the type of packet. In this embodiment, a write request packet, a read request packet, a response packet, an acknowledge packet, and the like are provided as the packet types. The label field is a field for setting a label for distinguishing the current transaction from other transactions. The retry field is a field for indicating whether or not the current transaction is performing a retry. The address size field is a field for indicating the size of an address (command) set in the address/command field.

The data length field is a field for indicating the data length. The data length indicates the number of bytes from CP to CRC1 (data length=sub header+transfer data+CRC), for example. The address/command field is a field for indicating an address (command). The CP field is a field for directing packet fragmentation (data division). The A+ field is a field for setting an address automatic update mode, and the A+ size field is a field for setting an address automatic update size (number of automatic updates). The port number field is a field for indicating a port number (transaction destination) which is the destination of the packet. The data/parameter field is a field for setting (inserting) write data (parameter). The read data request size field is a field for designating the data length of data returned by the response packet. The CRC field is a field for checking an error of the header and data of the packet. As the CRC generating polynomial, a standard equation (algorithm) such as "$G(X)=X^{16}+X^{12}+X^5+1$", may be used, for example.

The data/parameter field of the response packet is a field for setting (inserting) read data requested by the read request packet. For example, when the device has transmitted the read request packet to the partner device, the partner device sets read data corresponding to the read request packet in the data/parameter field of the response packet, and transmits the response packet.

The response code field of the acknowledge packet is a field for indicating the reception state of the received packet. For example, the response code field indicates that reception has succeeded when the response code value is "F", and indicates that reception has failed when the response code value is "0".

In this embodiment, the request packet includes the response request field as shown in FIGS. 2A and 2B. When the host (or target) has transmitted to the target (or host) a request packet in which "response requested" is set in the response request field, the target transmits an acknowledge packet (ACK or NACK) to the host as a response to the request packet. When the host has transmitted to the target a request packet in which "response not requested" is set in the response request field, the target does not transmit an acknowledge packet to the host. This realizes an efficient data transfer such as stream transfer.

Figure 4A:
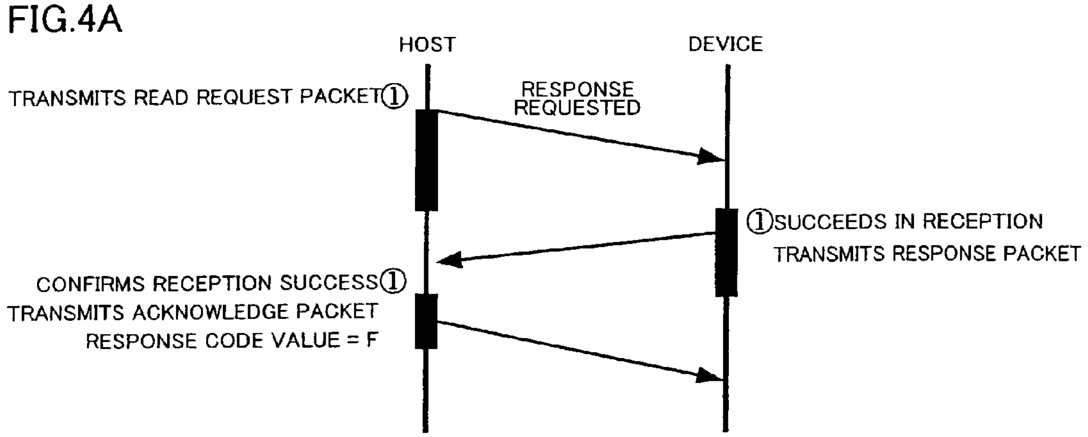
FIGS. 4A to 4C show transaction examples relating to a response request.
Figure 4B:
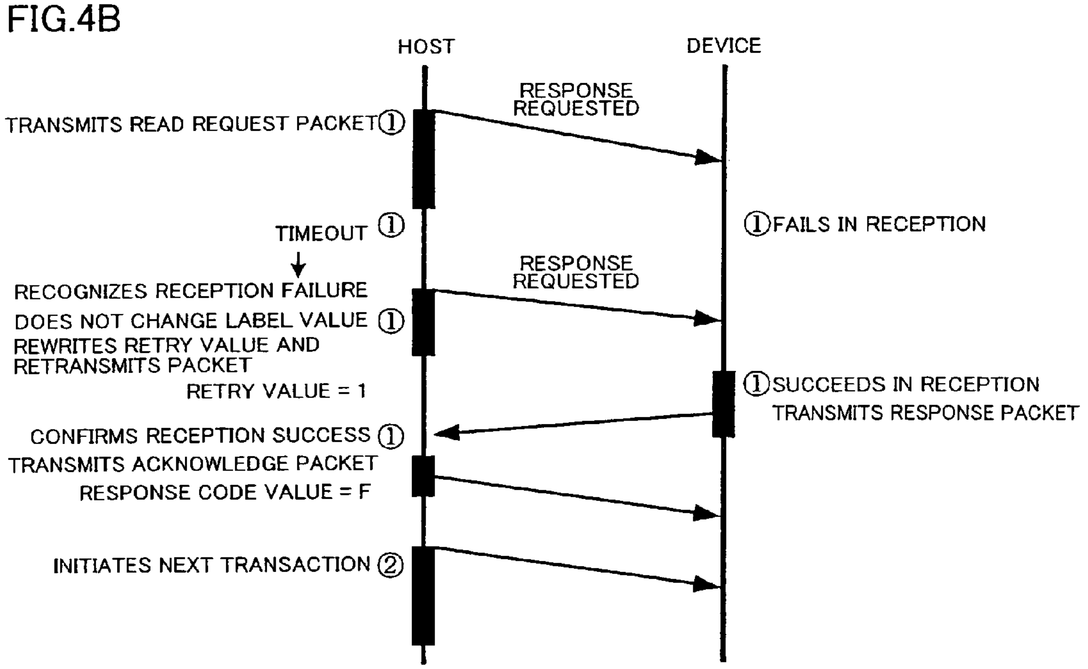
Figure 4C:
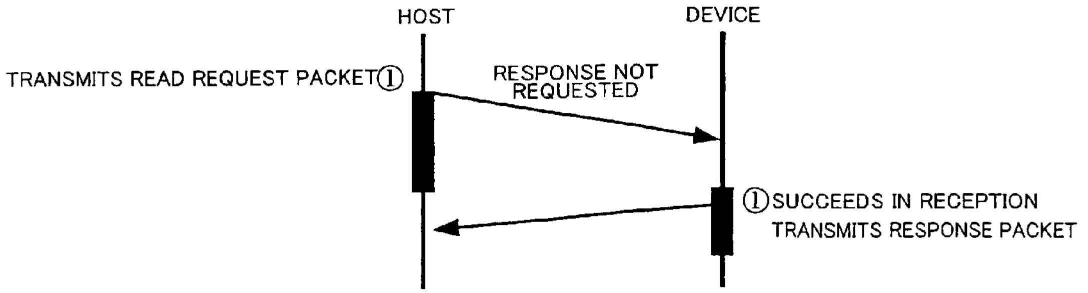

FIGS. 4A and 4B show transaction examples when "response requested" is set, and FIG. 4C shows a transaction example when "response not requested" is set.

In this embodiment, the request packet includes the response request field as described above. This enables one type of request packet to be selectively used as a packet for performing handshake transfer for reliably transferring data to the partner device and a packet for performing isochronous data transfer, such as stream data transfer, even at the sacrifice of reliability. Specifically, a request packet having an identical field configuration can be used as an asynchronous transfer packet or an isochronous transfer packet by rewriting the response request field. This makes it possible to deal with various situations while reducing the number of types of packets, whereby an efficient data transfer can be realized with a small number of types of packets.

In this embodiment, when the transmitter has transmitted a request packet in which "response not requested" is set in the response request field, the transmitter can transmit a request packet at an arbitrary timing without waiting for a response from the partner device. Therefore, the transmitter can generate and transmit a stream data request packet at an arbitrary timing, whereby an efficient data transfer can be realized with a small number of types of packets.

3. Configuration Example of Data Transfer Control Device

The target-side data transfer control device 30 (link controller 100) shown in FIG. 1 includes a reception packet buffer into which a packet transmitted from the host is written. However, it was found that the following problem occurs when the reception packet buffer has a single buffer configuration.

Specifically, when the reception packet buffer has a single buffer configuration, the entire packet received from the host is written into the packet buffer. After packet analysis such as a CRC check has been completed, the received packet is transmitted to the subsequent stage (e.g. application layer). After the entire packet (data) has been transmitted to the subsequent stage, receipt of the next packet commences and the packet is written into the reception packet buffer.

Therefore, the host (transmitter side) must wait for the target-side (receiver-side) reception packet buffer to become empty for a period from transmission of the packet to start of transmission of the next packet. Therefore, the host cannot continuously transmit packets to the target. In particular, when displaying a motion picture on the display panel 7, the host must continuously transmit packets to the target so that the motion picture is not interrupted. However, when the target-side reception packet buffer has a single buffer configuration, it is difficult to realize such a continuous packet transfer (stream transfer).

Figure 5:
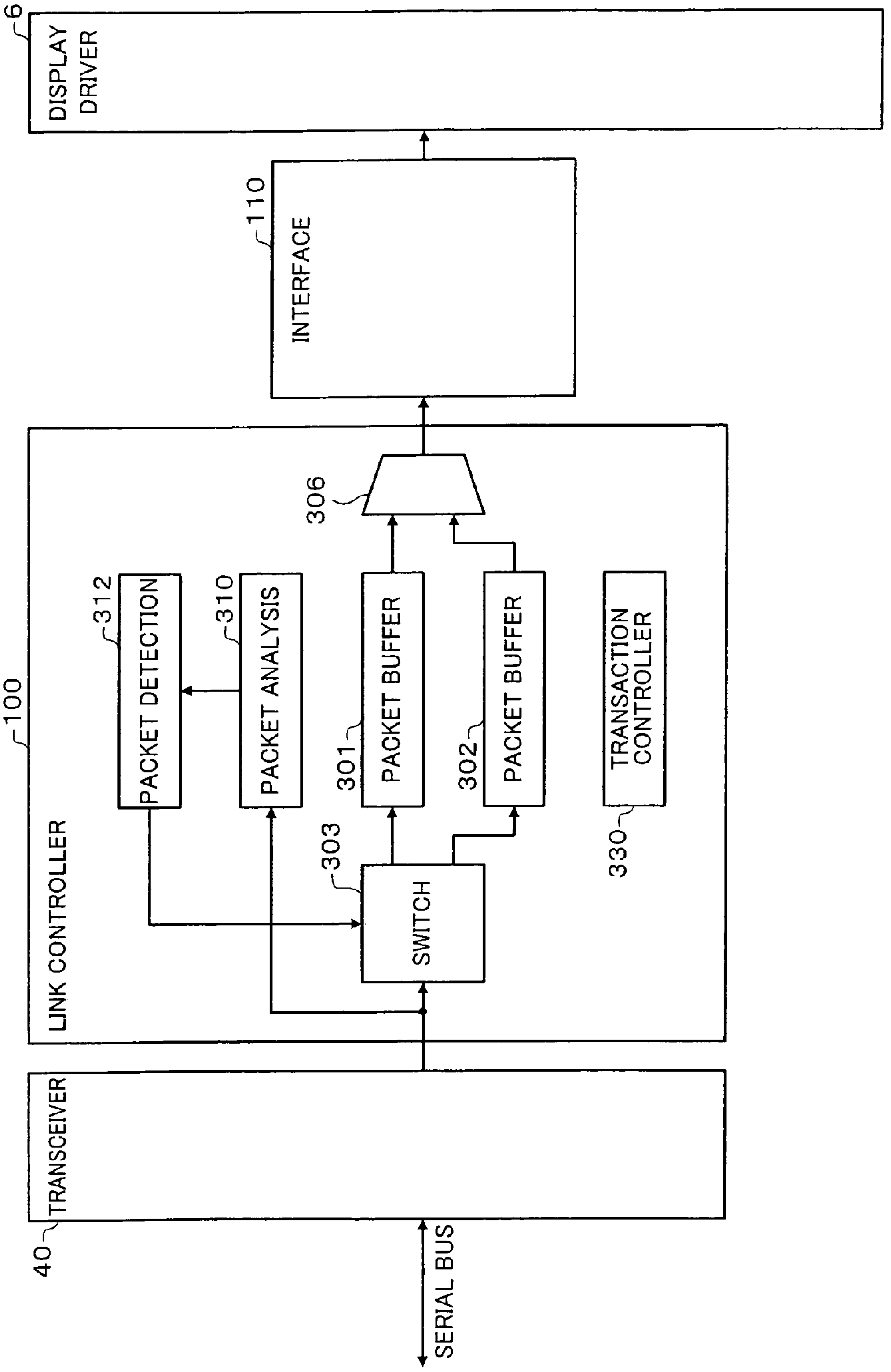
FIG. 5 shows a configuration example of the data transfer control device according to one embodiment of the invention.

FIG. 5 shows a configuration example of the data transfer control device according to one embodiment of the invention which can solve the above-described problem. Note that some of the circuit blocks shown in FIG. 5 may be omitted, or the configuration of the connection between the circuit blocks may be changed, or a circuit block differing from those shown in FIG. 5 may be additionally provided. Packet buffers 301 and 302, a switch circuit 303, a packet detection circuit 312, and the like may be provided either inside or outside the link controller 100.

In FIG. 5, the transceiver 40 including a physical layer analog circuit receives a packet (data) transmitted from the host-side data transfer control device 10 through the differential signal lines of the serial bus. The transceiver 40 transmits a packet to the host-side data transfer control device 10 through the differential signal lines of the serial bus.

The packet buffers 301 and 302 (first and second packet buffers) are buffers (reception packet buffers) into which a packet received through the serial bus is written. Specifically, a packet received through the serial bus is input from the transceiver 40 through the switch circuit 303 and written into the packet buffer 301 or 302. The packet buffers 301 and 302 may be formed by first-in first-out (FIFO) memories, for example. The packet buffers 301 and 302 may have a ring buffer structure.

The switch circuit 303 switches the write destination of the received packet. Specifically, the switch circuit 303 switches the write destination of the received packet between the packet buffers 301 and 302.

A multiplexer 306 selects the output from one of the packet buffers 301 and 302. For example, the multiplexer 306 selects the output from the packet buffer 301 when outputting information written into the packet buffer 301, and selects the output from the packet buffer 302 when outputting information written into the packet buffer 302.

A packet analysis circuit 310 analyzes a packet received through the serial bus. Specifically, the packet analysis circuit 310 separates the received packet into a header and data and extracts the header. The packet analysis circuit 310 analyzes the response request field to determine whether or not a response request is required, or analyzes the packet type field to determine the type (e.g. write request packet or read request packet) of the received packet. The packet analysis circuit 310 analyzes the address size field to determine the size of an address set in the address/command field.

Figure 6A:
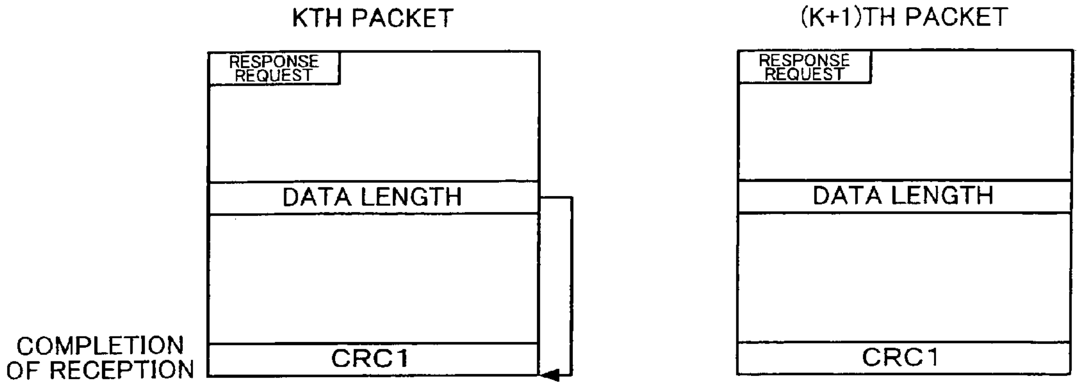
FIGS. 6A and 6B are diagrams illustrating detection of completion and start of packet reception.
Figure 6B:
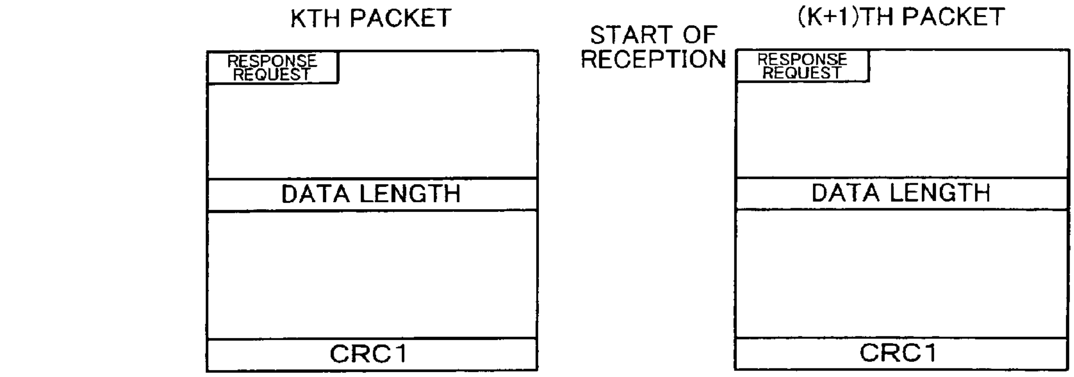

The packet detection circuit 312 receives the analysis results of the received packet from the packet analysis circuit 310. The packet detection circuit 312 detects completion of reception (end position) of the packet based on the analysis results. In more detail, as shown in FIG. 6A, the packet detection circuit 312 detects completion of reception of the packet (Kth packet) based on the data length set in the header of the packet. Specifically, the packet detection circuit 312 detects the end of CRC1 shown in FIGS. 2A and 2B. The packet detection circuit 312 may be realized by a byte counter which performs count processing based on the data length, for example. As shown in FIG. 6B, the packet detection circuit 312 may detect start of reception (start position) of the packet ((K+1)th packet). Specifically, the packet detection circuit 312 may detect the head of the response request field shown in FIGS. 2A and 2B.

A transaction controller 330 performs data transfer transaction layer processing. In more detail, the transaction controller 330 controls transfer of packets such as a request packet, a response packet, and an acknowledge packet, and controls a transaction made up of a plurality of packets. The transaction controller 330 controls each circuit block of the link controller 100.

A signal generator 112 included in the interface circuit 110 generates an interface signal (e.g. MPU interface signal) based on data from the link controller 100, interface information (timing information), and the like. The generated interface signal is output to the display driver 6 through the interface bus.

In this embodiment, the packet buffers 301 and 302 have a double buffer configuration. In more detail, as shown in FIG. 6A, when the Kth (K is an integer) packet has been written into one of the packet buffers 301 and 302 and completion of reception of the Kth packet has been detected by the packet detection circuit 312, the switch circuit 303 switches the write destination of the (K+1)th packet to the other of the packet buffers 301 and 302. For example, when the first packet has been written into the packet buffer 301 and completion of reception of the first packet has been detected, the switch circuit 303 switches the write destination of the second packet received after the first packet to the packet buffer 302. When the second packet has been written into the packet buffer 302 and completion of reception of the second packet has been detected, the switch circuit 303 switches the write destination of the third packet received after the second packet to the packet buffer 301.

As shown in FIG. 6B, when the Kth packet has been written into one of the packet buffers 301 and 302 and start of reception of the (K+1)th packet has been detected, the switch circuit 303 may switch the write destination of the (K+1)th packet to the other of the packet buffers 301 and 302. For example, when the first packet has been written into the packet buffer 301 and start of reception of the second packet has been detected, the switch circuit 303 switches the write destination of the second packet to the packet buffer 302. When the second packet has been written into the packet buffer 302 and start of reception of the third packet has been detected, the switch circuit 303 switches the write destination of the third packet to the packet buffer 301.

The data transfer efficiency can be increased by allowing the packet buffers 301 and 302 to have a double buffer configuration as described above. Specifically, when a reception packet buffer has a single buffer configuration, since a host must wait for the reception packet buffer to become empty, the host cannot continuously transmit packets to a target. In this embodiment, however, since the packet buffers 301 and 302 have a double buffer configuration, the host need not wait for the packet buffer to become empty, so that the host can continuously transmit packets to the target. In particular, when displaying a motion picture such as a television picture on the display panel 7, the host must continuously transmit packets to the target so that the motion picture is not interrupted. In this embodiment, since the packet buffers 301 and 302 have a double buffer configuration, a continuous packet transfer (stream transfer) can be implemented, so that a motion picture can be easily displayed on the display panel 7.

4. First Modification

Figure 7:
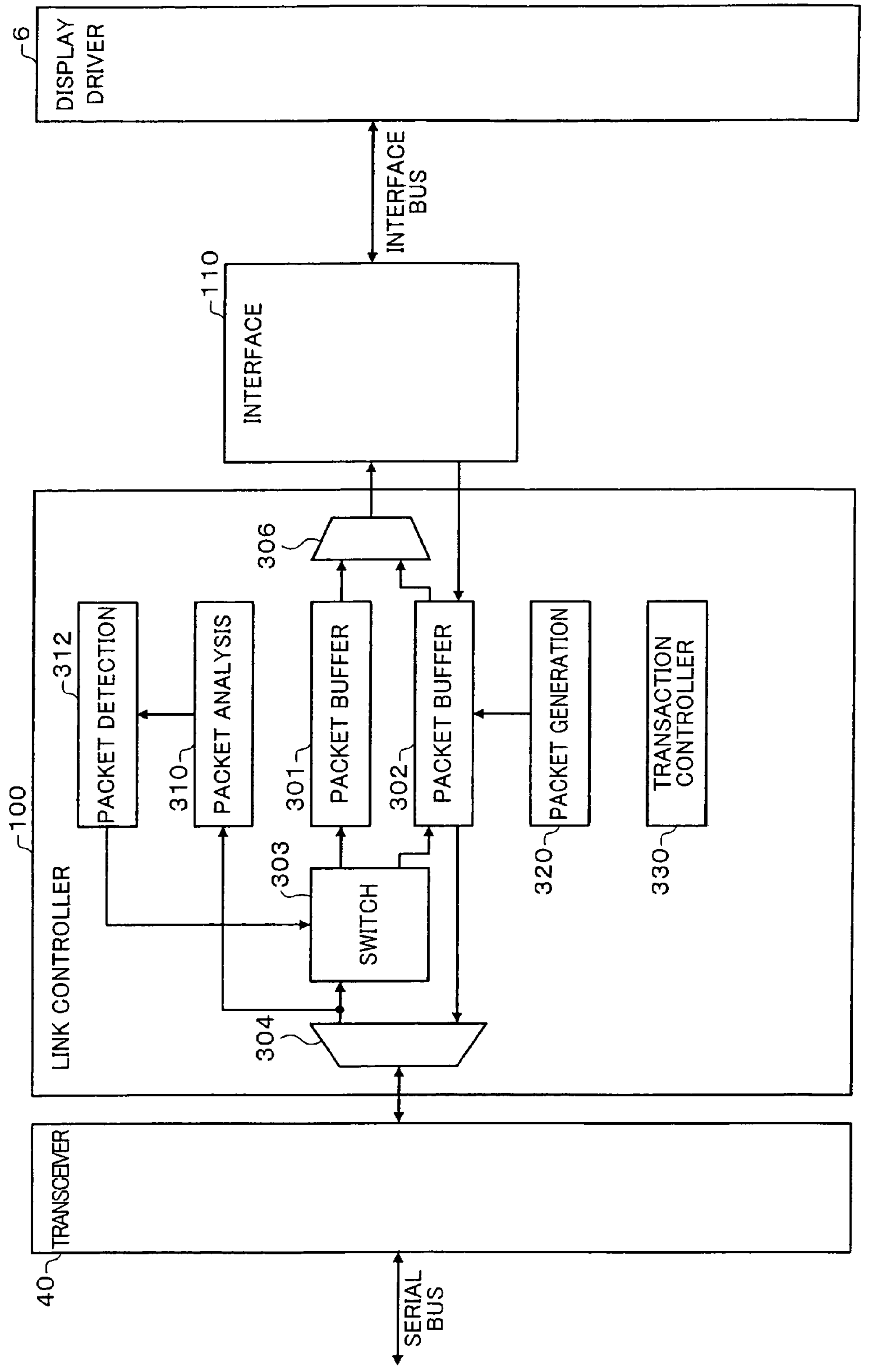
FIG. 7 shows a first modification of one embodiment of the invention.

FIG. 7 shows a first modification of the above embodiment of the invention. In the first modification shown in FIG. 7, a packet generation circuit 320 is provided in addition to the configuration shown in FIG. 5. The packet generation circuit 320 generates a packet (header) transmitted through the serial bus. In more detail, the packet generation circuit 320 generates a header of a packet to be transmitted, and assembles the packet by combining the header and data. In this case, the packet generation circuit 320 generates a header corresponding to the type of packet to be transmitted. For example, the packet generation circuit 320 generates a header as shown in the FIG. 3A when transmitting a response packet, and generates a header as shown in the FIG. 3B when transmitting an acknowledge packet.

In the first modification shown in FIG. 7, the packet buffer 302 (second packet buffer) is a transmission/reception packet buffer.

Specifically, when the packet received through the serial bus is a read request packet, the link controller 100 sets the packet buffer 301 as a reception packet buffer, and sets the packet buffer 302 as a transmission packet buffer. The received read request packet is written into the reception packet buffer 301, and a response packet or an acknowledge packet to be transmitted is written into the transmission packet buffer 302. For example, data (parameter) requested by the read request packet written into the reception packet buffer 301 is set (inserted) in the data/parameter field of the response packet. The response packet is written into the transmission packet buffer 302, and output to the transceiver 40 through a multiplexer 304. The transceiver transmits the input response packet to the host through the serial bus.

Figure 9:
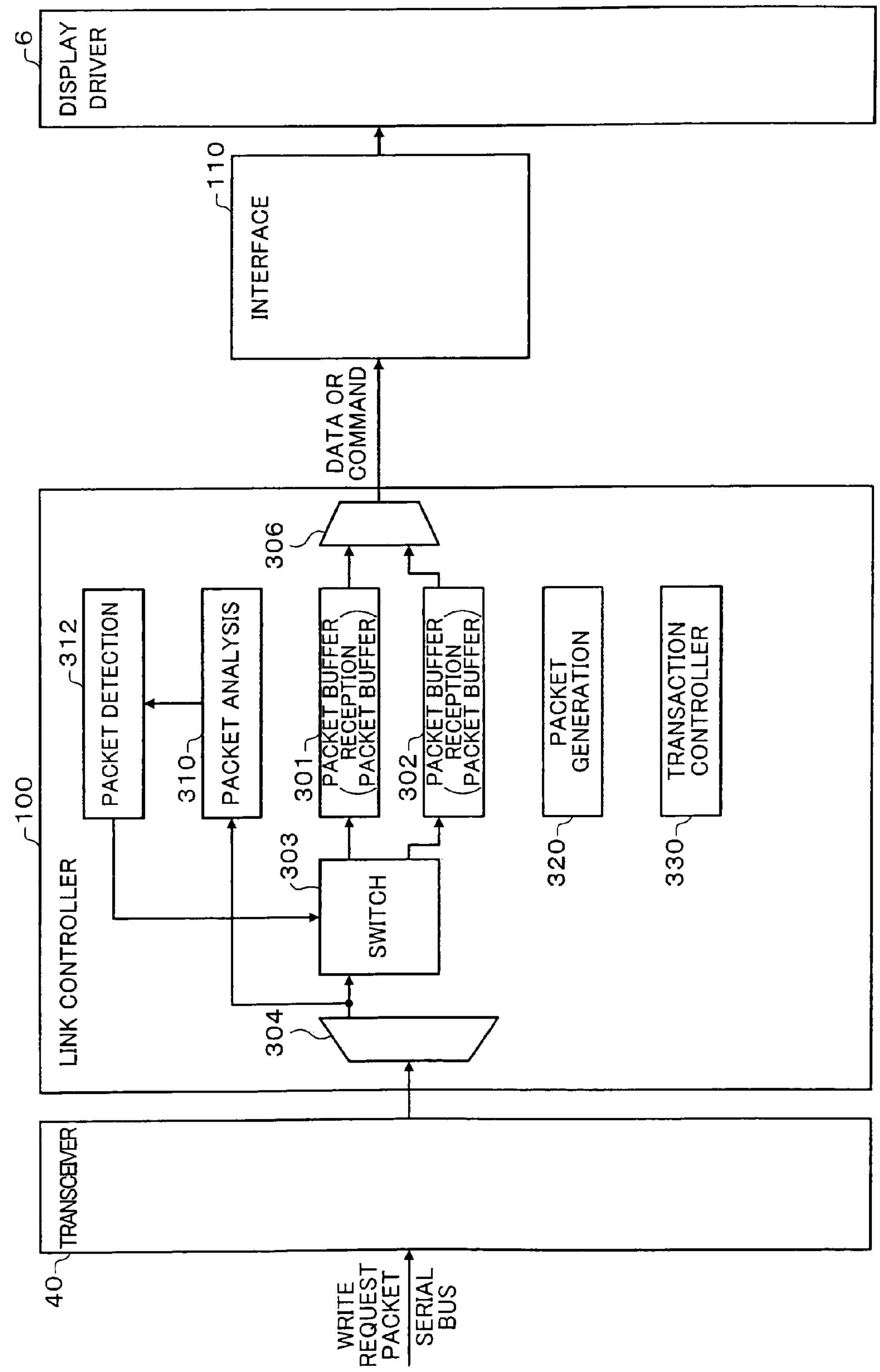
FIG. 9 shows the operation of the first modification.

As shown in FIG. 9, when the received packet is a write request packet, the link controller 100 sets the packet buffers 301 and 302 as reception packet buffers between which the write destination is switched by the switch circuit 303. Specifically, the link controller 100 causes the packet buffers 301 and 302 to have a double buffer configuration. In more detail, when the Kth packet has been written into one of the packet buffers 301 and 302 and completion of reception of the Kth packet (or start of reception of the (K+1)th packet) has been detected by the packet detection circuit 312, the switch circuit 303 switches the write destination of the (K+1)th packet to the other of the packet buffers 301 and 302. The data or command set in the write request packet written into the packet buffer 301 or 302 is output to the display driver 6 through the interface circuit 110.

In the first modification, since the packet buffers 301 and 302 are set as a single buffer configuration or a double buffer configuration corresponding to the type of request packet, the data transfer efficiency can be increased without increasing the circuit scale to a large extent.

Figure 8:
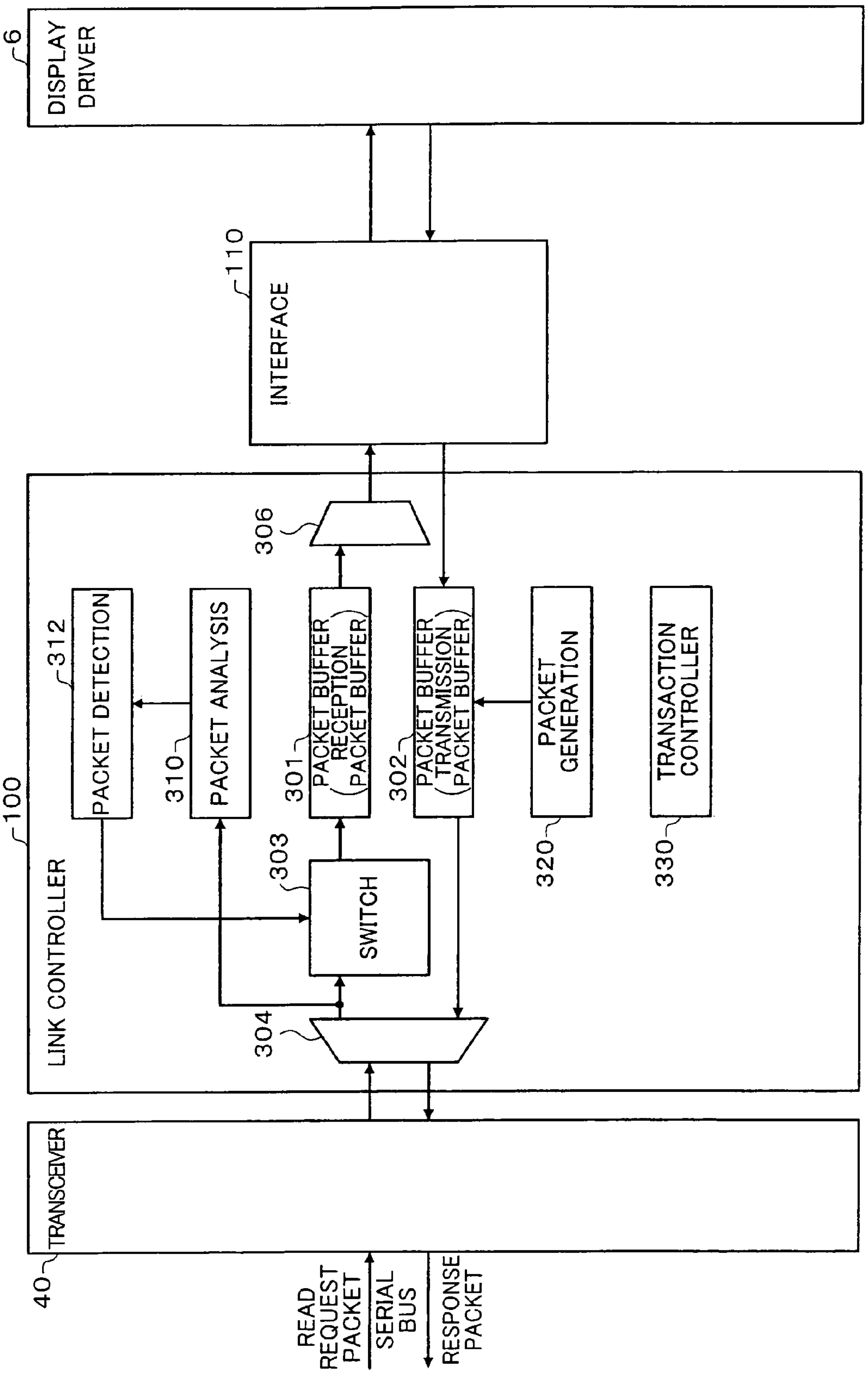
FIG. 8 shows the operation of the first modification.

Specifically, when the received packet is a read request packet, a response packet corresponding to the read request packet must be transmitted to the host. In this case, the first modification allows the packet buffer 301 to be set as a reception packet buffer and the packet buffer 302 to be set as a transmission packet buffer, as shown in FIG. 8. Therefore, a response packet corresponding to the read request packet written into the reception packet buffer 301 can be written into the transmission packet buffer 302 and transmitted to the host, whereby the data transfer efficiency can be increased.

In the first modification, the packet generation circuit 320 can generate in advance a response packet (header) based on the analysis results of the read request packet by the packet analysis circuit 310, and write the generated response packet into the transmission packet buffer 302. The link controller 100 can immediately transmit the response packet written into the transmission packet buffer 302 to the host when the link controller 100 has determined that it is necessary to transmit the response packet. Therefore, a time lag from reception of the read request packet to transmission of the response packet can be reduced, whereby the data transfer efficiency can be further increased.

When the received packet is a write request packet, it is unnecessary to transmit a response packet for the write request packet to the host. Therefore, the packet buffers 301 and 302 are set as reception packet buffers to form a double buffer configuration, as shown in FIG. 9. Therefore, the host need not wait for the packet buffer to become empty, so that the host can continuously transmit packets to the target. This enables a continuous packet transfer (stream transfer) to be realized, so that a motion picture can be easily displayed on the display panel 7.

As described with reference to FIG. 2A, the write request packet includes the response request field for indicating whether or not to perform handshake transfer using the acknowledge packet. It is preferable that a response request value "response not requested" be set in the response request field of the write request packet transmitted from the host in FIG. 9. When the packet received through the serial bus is a write request packet in which a response request value "response not requested" is set, the link controller 100 sets the packet buffers 301 and 302 as reception packet buffers between which the write destination is switched by the switch circuit 303.

Therefore, when the link controller 100 has received a write request packet in which a response request value "response not requested" is set, the link controller 100 can output a command or data for which writing has been requested to the interface circuit 110 without directing transmission of an acknowledge packet for the write request packet. Specifically, packet transfer such as stream transfer as shown in FIG. 4C can be performed, so that an efficient data transfer can be realized.

The switch circuit 303 may cancel switching of the write destination of the received packet when an error has been detected in the received packet. This prevents occurrence of unnecessary switch control, whereby the processing efficiency can be increased.

5. Notification of Non-Display Period Using Vertical Synchronization Signal

Figure 10A:
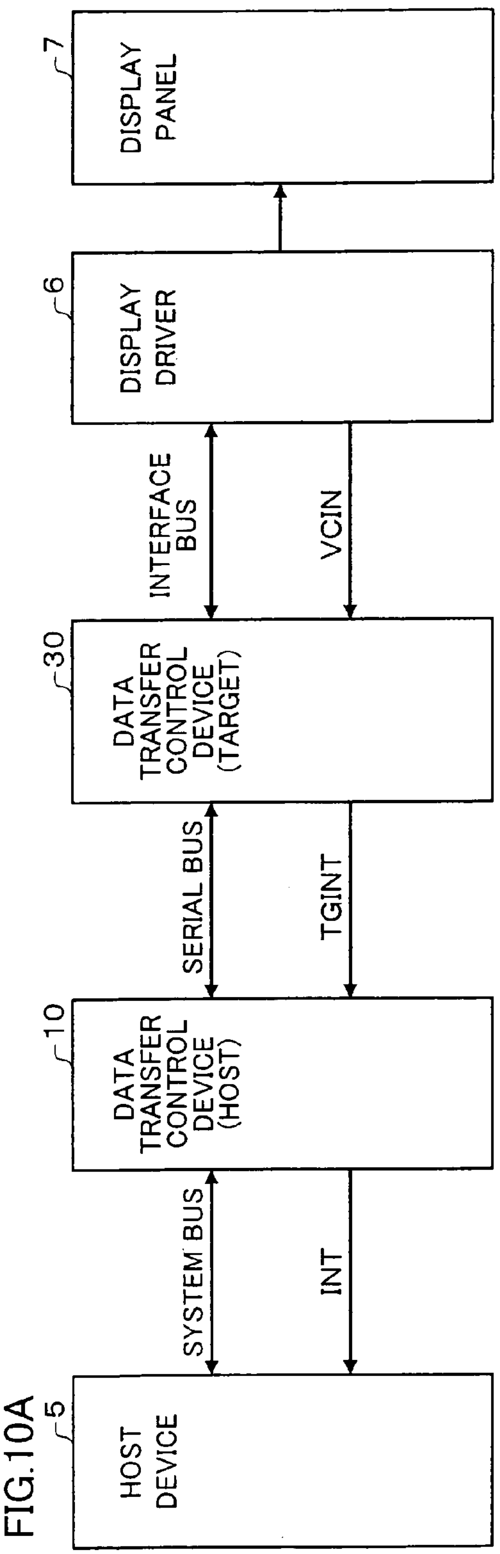
FIGS. 10A and 10B are diagrams illustrative of comparative examples.

As shown in FIG. 10A, the display driver 6 which drives the display panel 7 such as an LCD may generate the vertical synchronization signal VCIN. The display driver 6 may notify the host of the non-display period (vertical synchronization period) of the display panel 7 using the vertical synchronization signal VCIN.

In a first comparative example shown in FIG. 10A, when the vertical synchronization signal VCIN is output, the target-side data transfer control device 30 receives the vertical synchronization signal VCIN, and outputs an interrupt signal TGINT to the host-side data transfer control device 10. Upon receiving the interrupt signal TGINT, the host-side data transfer control device 10 outputs an interrupt signal INT to the host device 5. This enables the host device 5 to be notified that the display panel 7 is in the non-display period.

However, the first comparative example shown in FIG. 10A requires a signal line for the interrupt signal TGINT in addition to the serial bus which can reduce the number of signal lines. Therefore, it is impossible to fully achieve the objective of reducing the number of signal lines provided in the connection section between the first instrument section provided with buttons for inputting a telephone number and the second instrument section provided with an LCD or a camera.

Figure 10B:
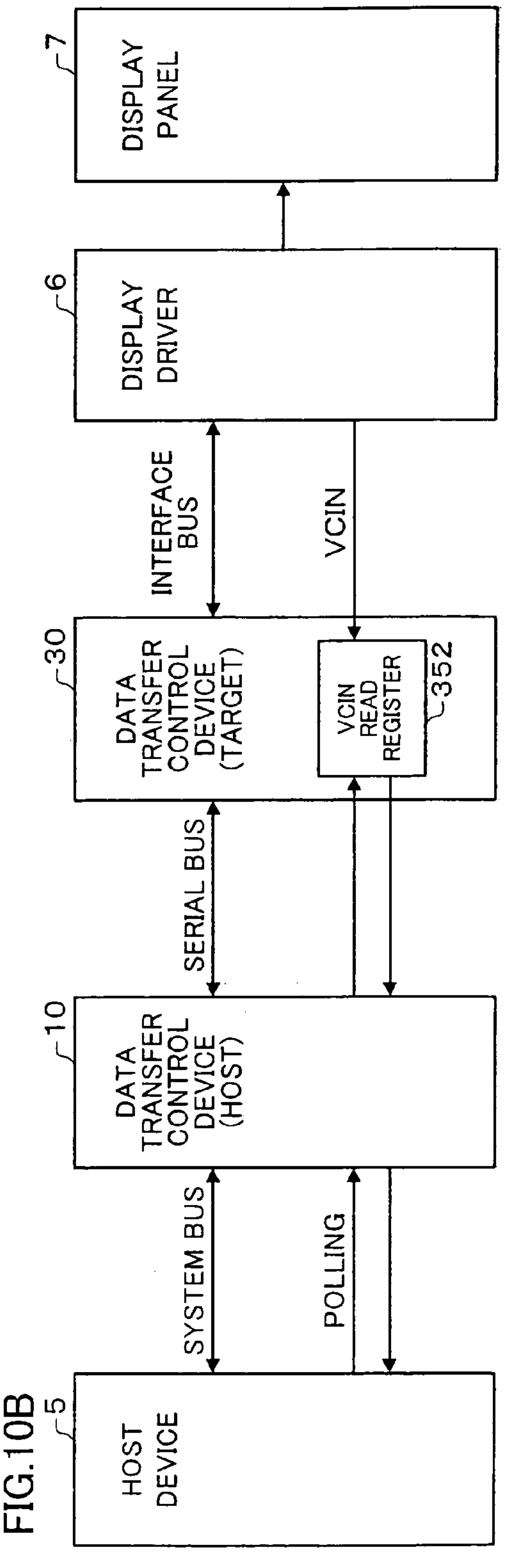

In a second comparative example shown in FIG. 10B, a VCIN read register 352 for reading the status of the vertical synchronization signal VCIN is provided in the target-side data transfer control device 30. As indicated by A1 in FIG. 11, the host transmits a read request packet RREQ (FIG. 2B) which requests reading of the status from the VCIN read register 352. When the vertical synchronization signal VCIN is not input from the display driver 6, the target transmits to the host a response packet RESP (FIG. 3A) which indicates that the vertical synchronization signal VCIN is not input, as indicated by A2 in FIG. 11. When the vertical synchronization signal VCIN has been input from the display driver 6, the target transmits to the host a response packet RESP which indicates that the vertical synchronization signal VCIN has been input, as indicated by A3. Then, as indicated by A4, the host transmits to the target a write request packet WREQ in which a command or data is set.

Figure 11:
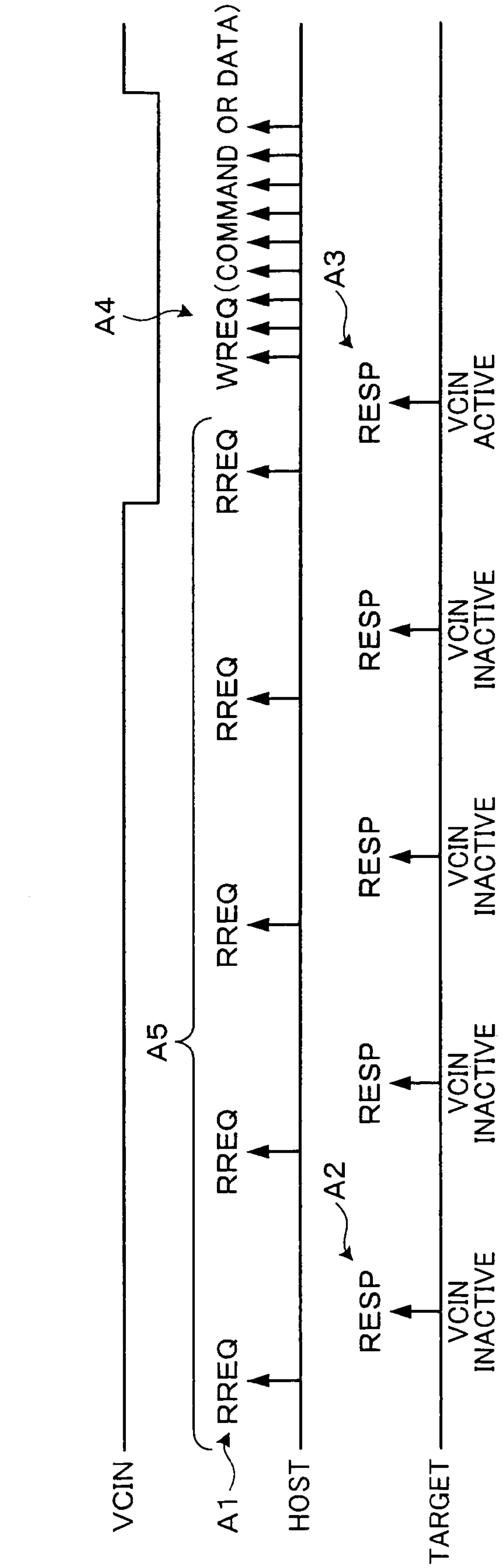
FIG. 11 is a diagram illustrative of a comparative example.

However, in the second comparative example shown in FIG. 10B, the host device 5 must always poll and monitor the status set in the VCIN read register 352 until the display driver 6 outputs the vertical synchronization signal VCIN, as indicated by A5 in FIG. 11. Therefore, the host device 5 cannot perform the necessary processing (control of the entire electronic instrument and processing as the baseband engine) in this period, whereby the processing of the host device 5 is hindered.

6. Second Modification

Figure 12:
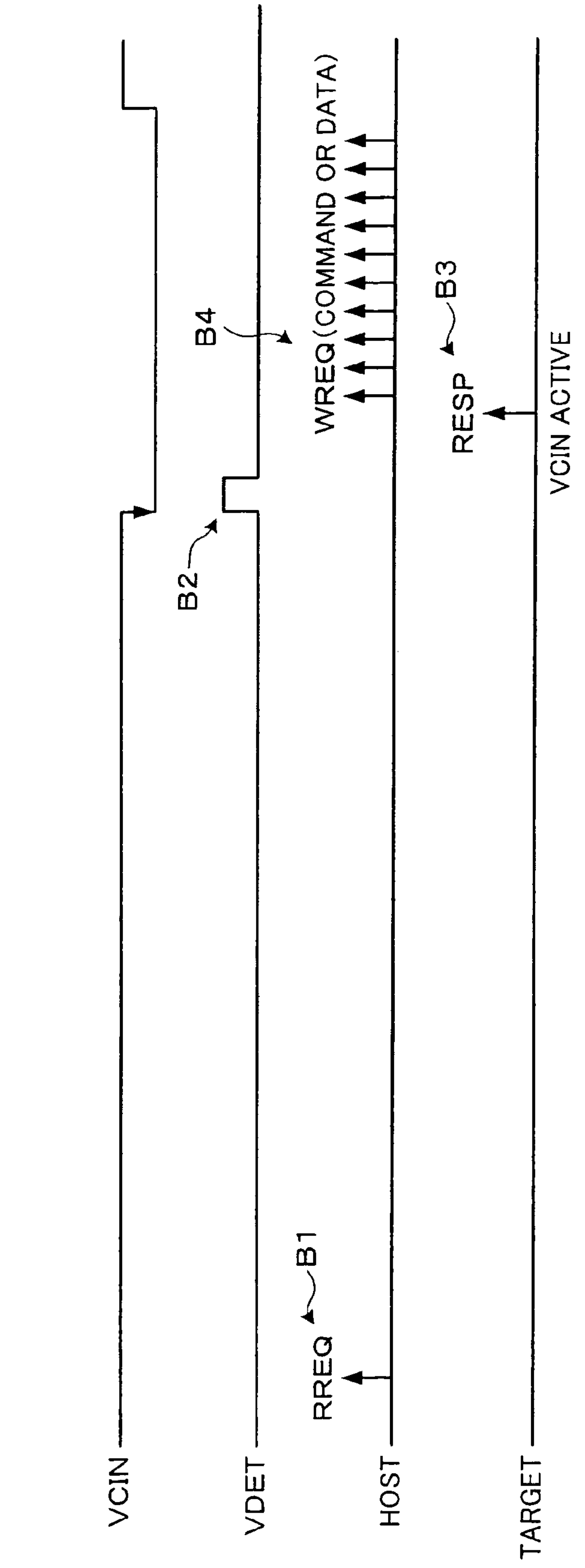
FIG. 12 is a diagram illustrative of a method of a second modification of one embodiment of the invention.

FIG. 12 shows a method according to a second modification which can solve the above-described problems. Specifically, after the host has transmitted the read request packet RREQ which request reading of the status of the vertical synchronization signal VCIN as indicated by B1 in FIG. 12, the target (data transfer control device 30) does not immediately transmit the response packet RESP for the read request packet RREQ. The target performs the detection operation of the vertical synchronization signal VCIN input from the display driver 6. As indicated by B2 in FIG. 12, a detection signal VDET is set to active when the vertical synchronization signal VCIN from the display driver 6 has been detected. When the detection signal VDET has been set to active, the target transmits the response packet RESP for the read request packet RREQ indicated by B1 to the host, as indicated by B3. The target may transmit an acknowledge packet instead of the response packet RESP.

When the host has received the response packet RESP indicated by B3 in FIG. 12, the host transmits to the target the write request packet WREQ in which a command or data is set, as indicated by B4. The target outputs the command or data set in the write request packet WREQ to the display driver 6. This enables the command or data to be transferred to the display driver 6 in the non-display period of the display panel 7. Therefore, the display operation of the display panel 7 can be prevented from being adversely affected by transferring the command or data.

Figure 13:
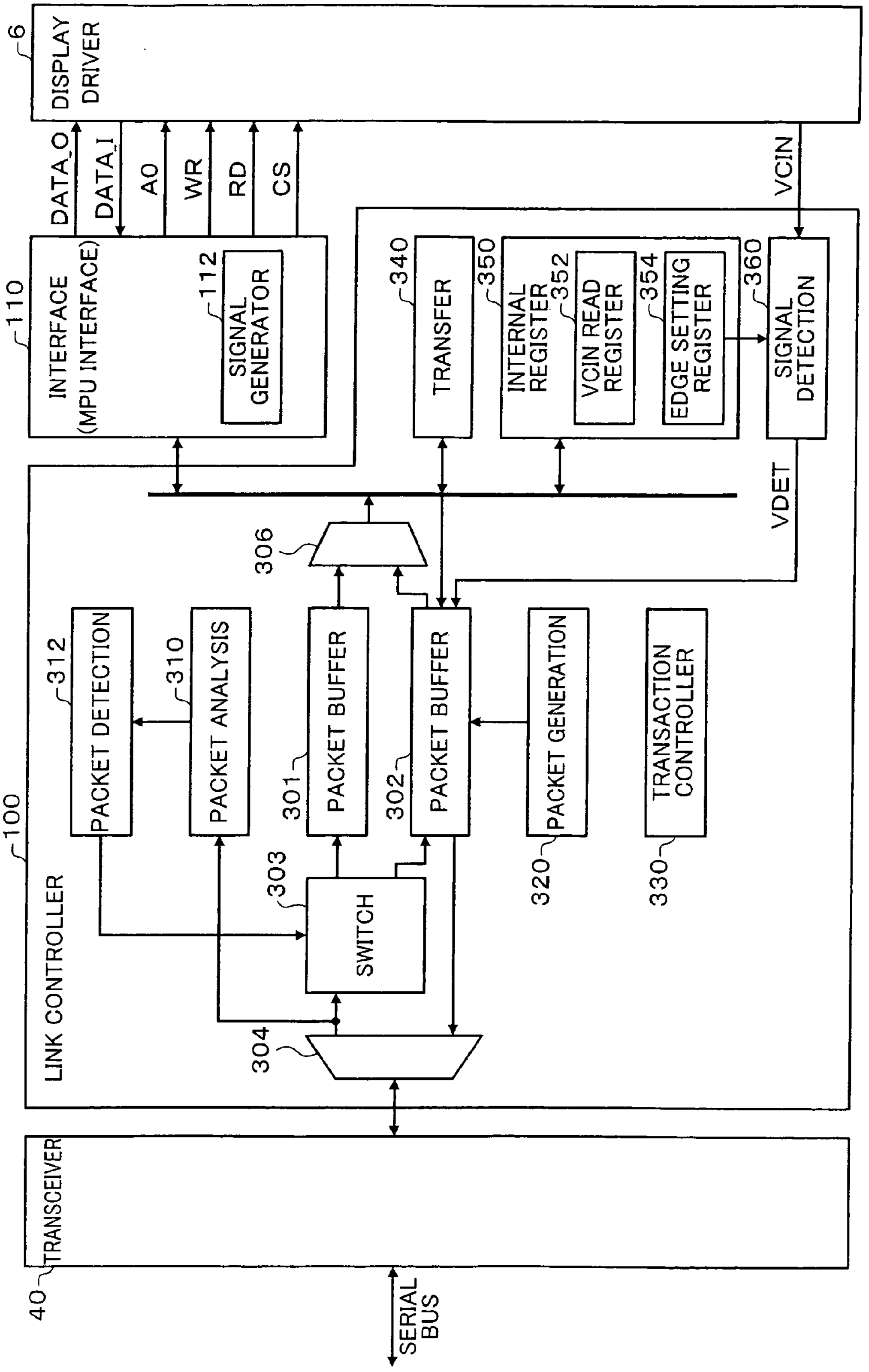
FIG. 13 shows the second modification.

FIG. 13 shows a configuration of the second modification of the embodiment of the invention which can realize the method shown in FIG. 12. In the second modification shown in FIG. 13, a transfer circuit 340, an internal register 350, and a signal detection circuit 360 are provided in addition to the configuration of the first modification shown in FIG. 7. These circuits may be provided either inside or outside the link controller 100.

The transfer circuit 340 controls information transfer in the link controller 100. In more detail, the transfer circuit 340 transfers information written into the packet buffer 301 to the interface circuit 110 or the internal register 350. The transfer circuit 340 transfers information from the interface circuit 110 or information from the internal register 350 to the packet buffer 302.

The internal register 350 includes various control registers and status registers. The internal register 350 stores interface information for specifying the signal type (output format) of the interface signal output from the interface circuit 110 or the like.

A VCIN read register 352 (dummy register) included in the internal register 350 is a register for reading the status of the vertical synchronization signal VCIN from the display driver 6. In the second modification, after the target has received a read request packet which requests reading of the status of the vertical synchronization signal VCIN from the host, the target does not immediately transmit a response packet (FIG. 3A) for the read request packet (FIG. 2B). The target waits for the detection signal VDET to be output from the signal detection circuit 360, and transmits a response packet (or acknowledge packet) for the read request packet to the host through the serial bus on condition that the detection signal VDET has been output.

An edge setting register 354 included in the internal register 350 is a register for setting whether to detect either the rising edge or the falling edge of the vertical synchronization signal VCIN.

The signal detection circuit 360 detects the vertical synchronization signal VCIN when the vertical synchronization signal VCIN for indicating the non-display period of the display panel has been input from the display driver 6, and outputs the detection signal VDET. The signal detection circuit 360 detects the vertical synchronization signal VCIN according to the value set in the edge setting register 354 (edge polarity setting of the vertical synchronization signal VCIN). For example, when "rising edge detection" is set in the edge setting register 354, the signal detection circuit 360 outputs the detection signal VDET on condition that the rising edge of the vertical synchronization signal VCIN has been detected. When "falling edge detection" is set in the edge setting register 354, the signal detection circuit 360 outputs the detection signal VDET on condition that the falling edge of the vertical synchronization signal VCIN has been detected. For example, when "falling edge detection" is set in the edge setting register 354, the detection signal VDET is set to active at the falling edge of the vertical synchronization signal VCIN, as indicated by B2 in FIG. 12. The display driver may output a low-active (negative logic) vertical synchronization signal VCIN or a high-active (positive logic) vertical synchronization signal VCIN depending on the type of display driver. It is possible to deal with various display drivers by providing the edge setting register 354.

Figure 14:
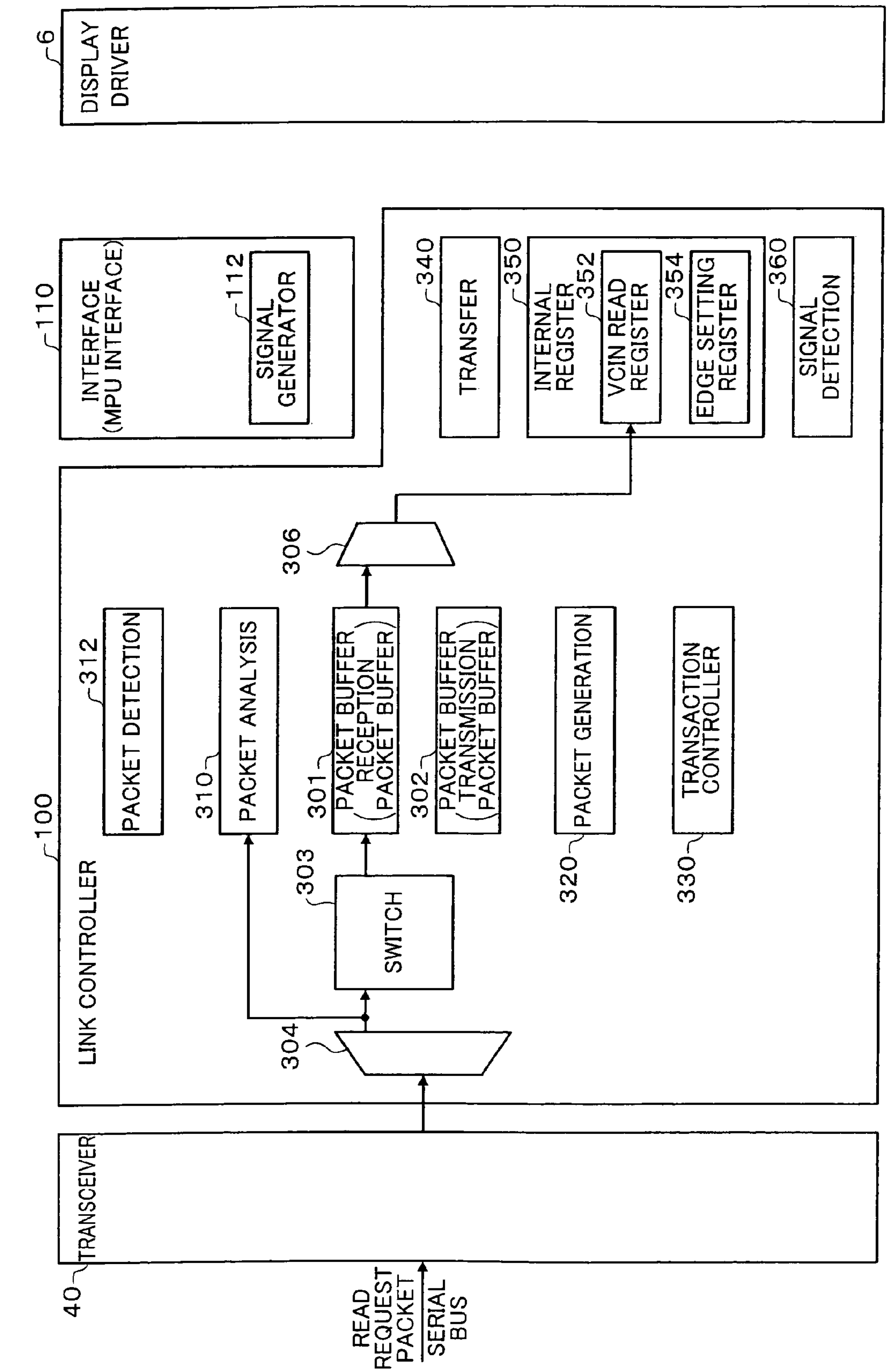
FIG. 14 shows the operation of the second modification.

The operation according to the second modification is described below with reference to FIGS. 14 to 18. As shown in FIG. 14, when the target has received a read request packet from the host, the received read request packet is written into the reception packet buffer 301 through the multiplexer 304 and the switch circuit 303. The packet analysis circuit 310 analyzes the received read request packet.

When the received read request packet is a packet which requests reading of the status of the vertical synchronization signal VCIN (packet which requests reading from the VCIN read register 352), the read operation (dummy read) from the VCIN read register 352 is performed. In the second comparative example shown in FIGS. 10B and 11, the target immediately transmits the response packet for indicating the status of the VCIN read register 352. In the second modification, the target waits for the detection signal VDET of the vertical synchronization signal VCIN to be output from the signal detection circuit 360 without immediately transmitting the response packet.

Figure 15:
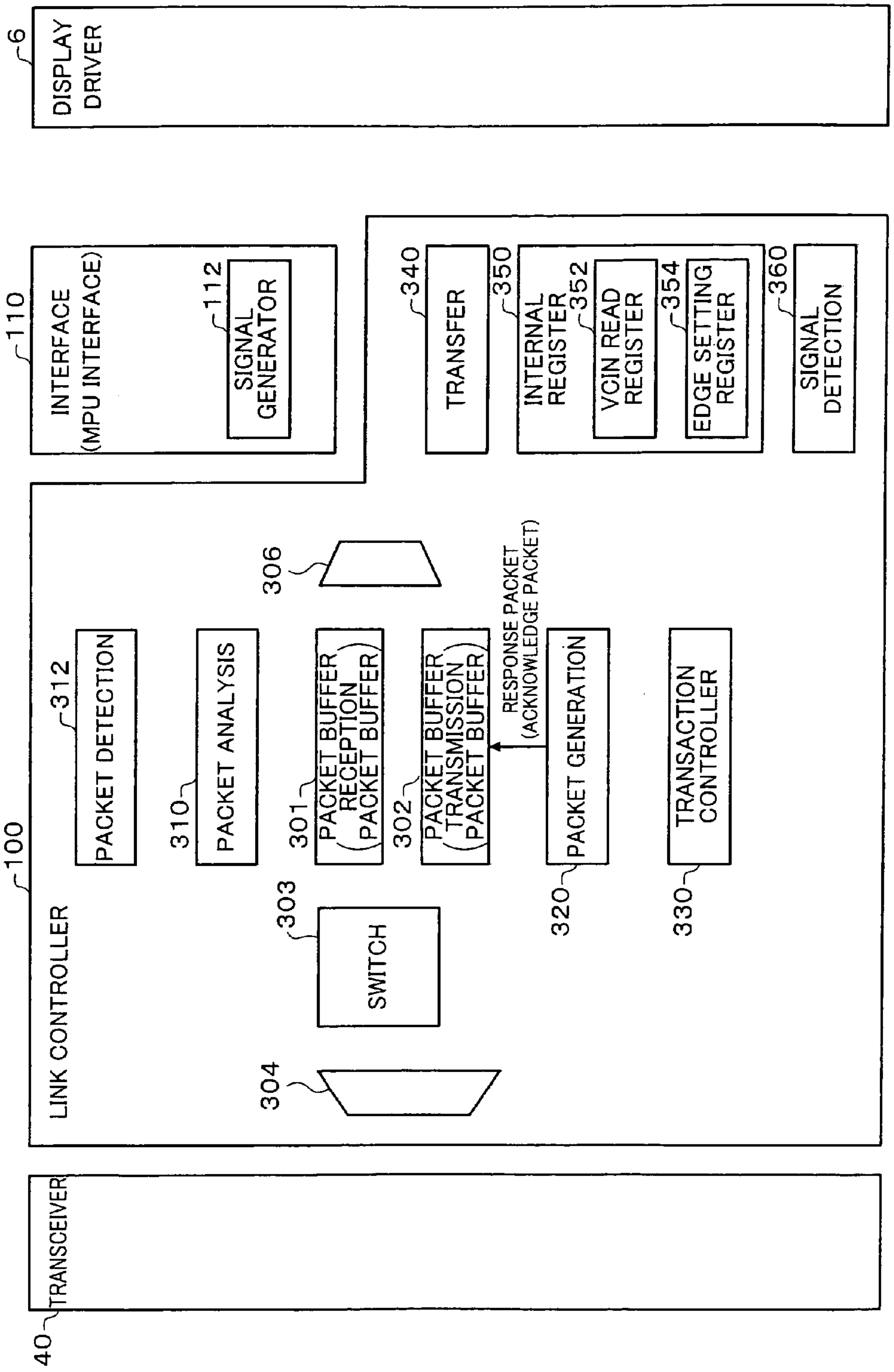
FIG. 15 shows the operation of the second modification.

In this case, after the target has received the read request packet which requests reading of the status of the vertical synchronization signal VCIN, the packet generation circuit 320 (header generation circuit) generates in advance a header of a response packet (acknowledge packet) for the read request packet. In more detail, the packet generation circuit 320 generates in advance a response packet (acknowledge packet) for the read request packet, and writes the generated packet into the transmission packet buffer 302, as shown in FIG. 15. The response packet can be immediately transmitted upon detection of the vertical synchronization signal VCIN by providing the response packet (acknowledge packet) in advance, whereby the packet transfer efficiency can be increased. Specifically, since a time lag from detection of the vertical synchronization signal VCIN to transmission of the response packet can be reduced, the host can be notified that the display panel 7 is in the non-display period within a short time.

Figure 16:
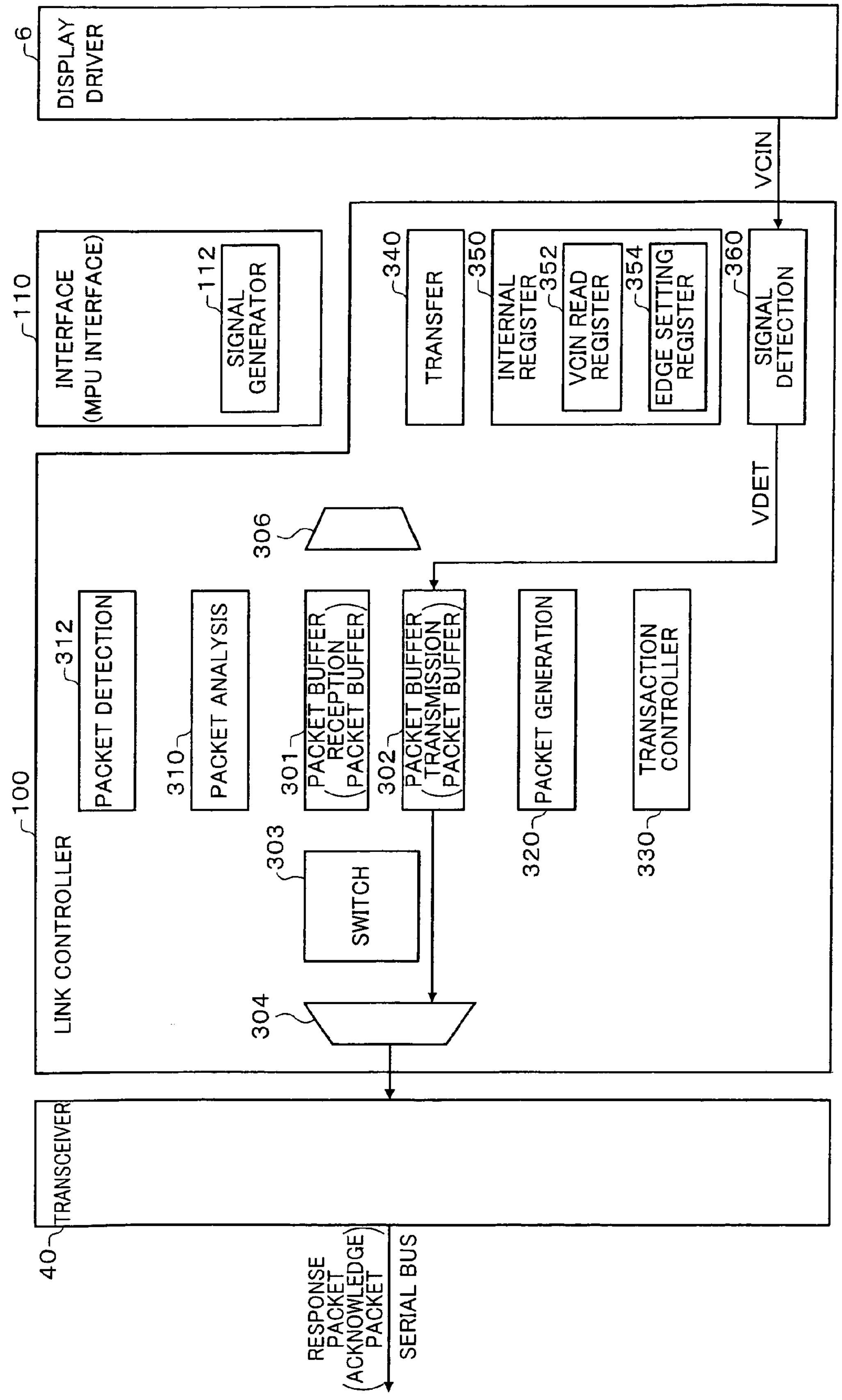
FIG. 16 shows the operation of the second modification.

As shown in FIG. 16, when the display panel 7 has entered the non-display period and the display driver 6 has output the vertical synchronization signal VCIN, the signal detection circuit 360 detects the vertical synchronization signal VCIN and outputs the detection signal VDET (see B2 in FIG. 12). The link controller 100 (transaction controller 330) then transmits a response packet (acknowledge packet) for the read request packet through the serial bus (see B3 in FIG. 12). Specifically, the link controller 100 outputs information of the response packet to the transceiver 40 to direct the transceiver 40 to transmit the response packet.

When the packet generation circuit 320 has generated in advance the response packet (acknowledge packet) and written the generated packet into the transmission packet buffer 302, the link controller 100 reads the written response packet (acknowledge packet) from the packet buffer 302 and transmits the response packet through the serial bus. This reduces a time lag from detection of the vertical synchronization signal VCIN to transmission of the response packet.

Figure 17:
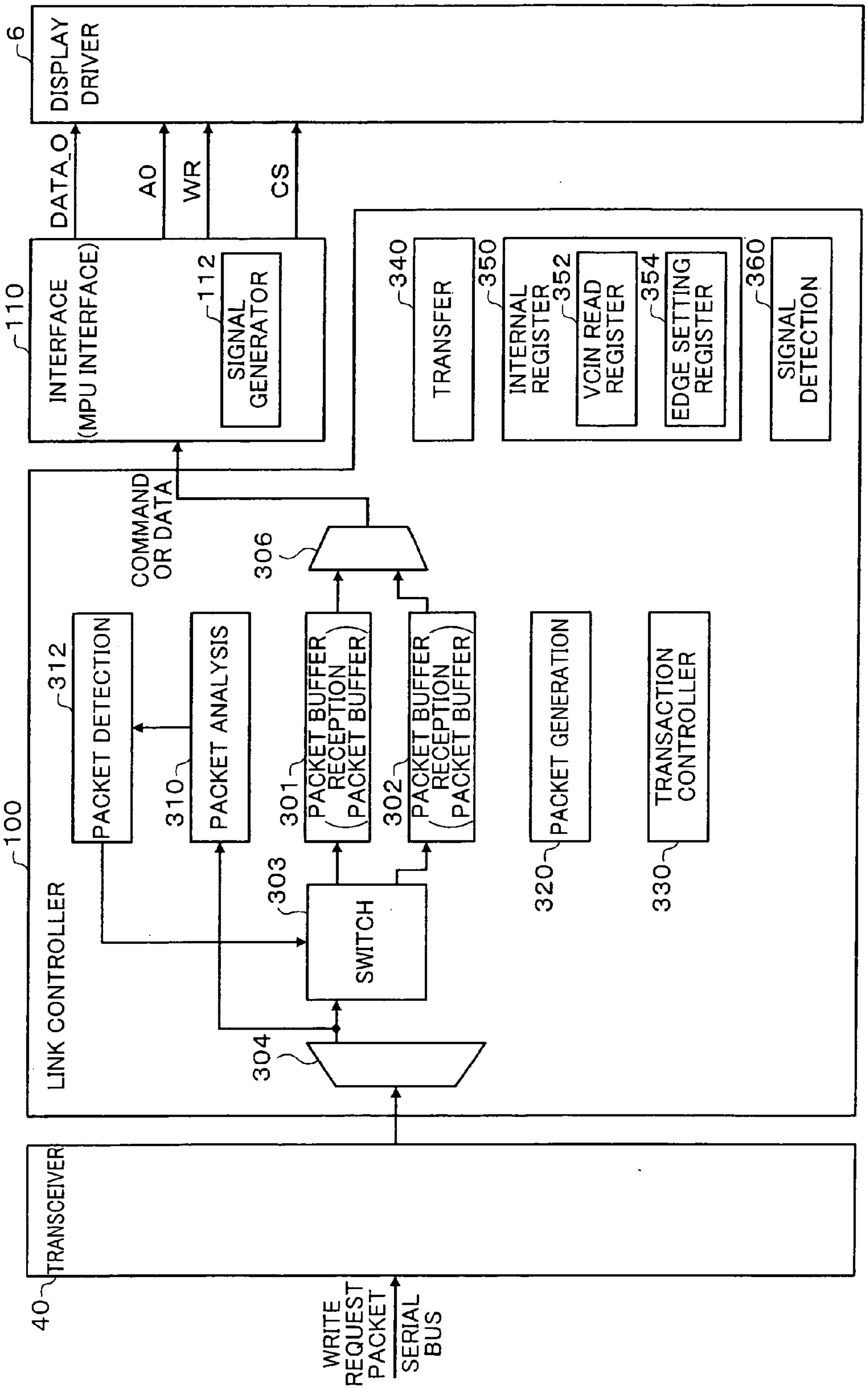
FIG. 17 shows the operation of the second modification.

The host which has received the response packet is notified that the display panel 7 is in the non-display period. The host transmits a write request packet which requests writing of a command or data through the serial bus as shown in FIG. 17 in order to write a command or data (parameter) into the register or RAM of the display driver 6 in the non-display period. Specifically, the host transmits a write request packet in which a command is set (inserted) in the address/command field or a write request packet in which data is set in the data/command field (see B4 in FIG. 12).

When the link controller 100 has received the write request packet which requests writing of a command or data after the response packet (acknowledge packet) has been transmitted through the serial bus, the link controller 100 outputs the command or data (parameter) for which writing has been requested to the interface circuit 110, as shown in FIG. 17. Specifically, the link controller 100 extracts the command or data set in the write request packet from the write request packet written into the reception packet buffer 301 through the multiplexer 304, and outputs the extracted command or data to the interface circuit 110.

Figure 18:
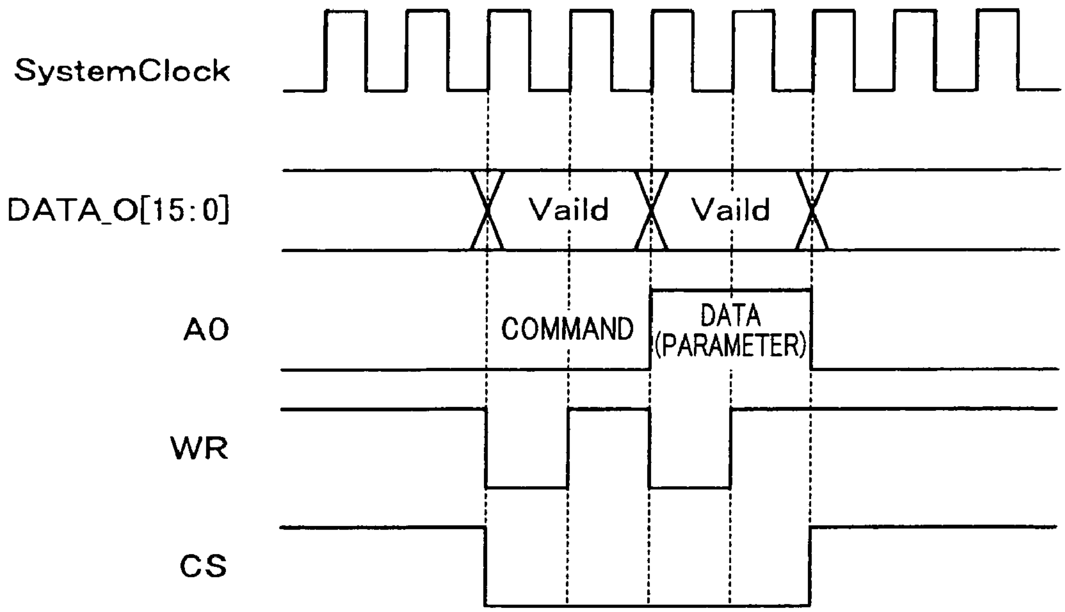
FIG. 18 shows a waveform example of an MPU interface signal.

The interface circuit 110 outputs the command or data output from the link controller 100 to the display driver 6 through the interface bus. FIG. 18 shows a signal waveform example of the interface bus in this case.

In FIG. 18, when a CS signal is set at the low level, the display driver 6 is chip-selected. The display driver 6 recognizes that a DATA_O signal is a command when an A0 signal is set at the low level, and recognizes that the DATA_O signal is data (command parameter) when the A0 signal is set at the high level. The command or data of the DATA_O signal is written into the display driver 6 when a WR signal is set at the low level.

This enables the command or data from the host to be written into the register or RAM of the display driver 6 in the non-display period of the display panel 7. Therefore, the display operation of the display panel 7 can be prevented from being adversely affected by the command or data write operation.

It is preferable that a response request value "response not requested" be set in the response request field of the write request packet transmitted from the host in FIG. 17. This enables the link controller 100 to output a command or data for which writing has been requested to the interface circuit 110 without directing transmission of an acknowledge packet for the write request packet, whereby an efficient data transfer can be realized.

In particular, when the non-display period of the display panel 7 is short, it is necessary to write a command or data into the display driver 6 within such a short time. In the second modification, since a response request value "response not requested" is set in the write request packet, the host need not wait for reception of an acknowledge packet. Therefore, the host can transmit a number of write request packets within a short time as indicated by B4 in FIG. 12. Therefore, even if the non-display period of the display panel 7 is short, a command or data can be appropriately written into the display driver 6 within such a short time.

7. Data Transfer Method Using Differential Signals

Figure 19:
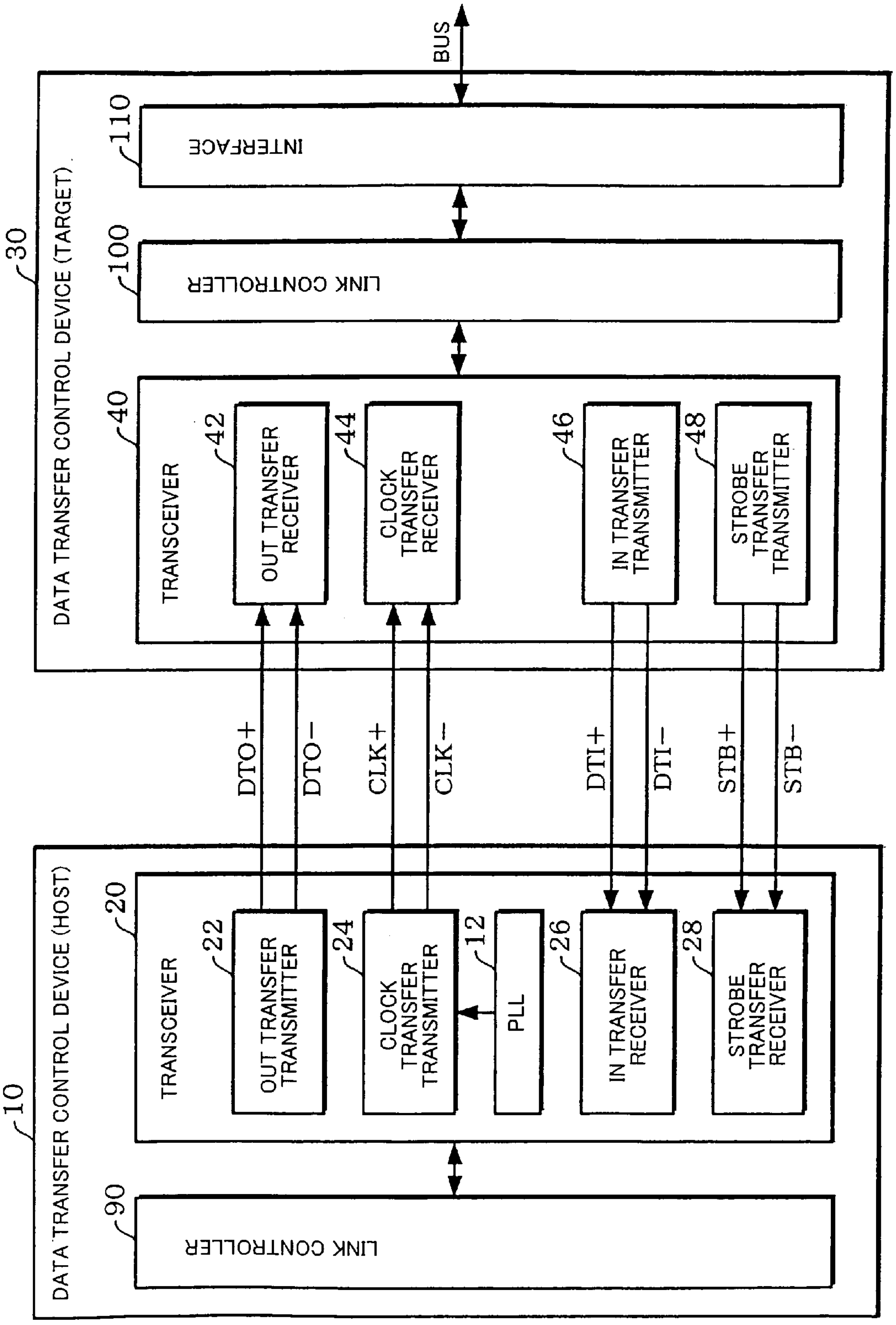
FIG. 19 is a diagram illustrative of serial transfer according to one embodiment of the invention.

The serial transfer method according to one embodiment of the invention is described below with reference to FIG. 19. In FIG. 19, DTO+ and DTO− indicate data (OUT data) output from the host (data transfer control device 10) to the target (data transfer control device 30). CLK+ and CLK− indicate clock signals supplied from the host to the target. The host outputs the data DTO+/− in synchronization with the edge (e.g. rising edge; may be falling edge) of the clock signals CLK+/−. Therefore, the target can sample and store the data DTO+/− using the clock signals CLK+/−. In FIG. 19, the target operates based on the clock signals CLK+/− supplied from the host. Specifically, the clock signals CLK+/− serve as a system clock signal of the target. Therefore, a phase locked loop (PLL) circuit 12 (clock signal generation circuit in a broad sense) is provided to the host, and is not provided to the target.

DTI+ and DTI− indicate data (IN data) output from the target to the host. STB+ and STB− indicate strobes (clock signals in a broad sense) supplied from the target to the host. The target generates and outputs the strobes STB+/− based on the clock signals CLK+/− supplied from the host. The target outputs the data DTI+/− in synchronization with the edge (e.g. rising edge; may be falling edge) of the strobes STB+/−. Therefore, the host can sample and store the data signals DTI+/− using the strobes STB+/−.

The data DTO+/−, the clock signals CLK+/−, the data DTI+/−, and the strobes STB+/− are transmitted by causing a transmitter circuit (driver circuit) to current-drive (voltage-drive) the corresponding differential signal lines, for example. In order to realize a higher speed transfer, two or more pairs of DTO+/− differential signal lines and DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. Note that some of these circuit blocks may be omitted.

The OUT transfer and clock transfer transmitter circuits 22 and 24 respectively transmit the data DTO+/− and the clock signals CLK+/− by current-driving the DTO+/− differential signal lines and the CLK+/− differential signal lines. The OUT transfer and clock transfer receiver circuits 42 and 44 respectively receive the data DTO+/− and the clock signals CLK+/− by performing a current/voltage conversion based on current which flows through the DTO+/− differential signal lines and the CLK+/− differential signal lines, and comparing (differential amplification processing) the differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines. The IN transfer and strobe transfer receiver circuits 26 and 28 respectively receive the data DTI+/− and the strobes STB+/− by performing a current/voltage conversion based on current which flows through the DTI+/− differential signal lines and the STB+/− differential signal lines, and comparing (differential amplification processing) the differential voltage signals (first and second voltage signals) obtained by the current/voltage conversion.

8. Electronic Instrument

Figure 20:
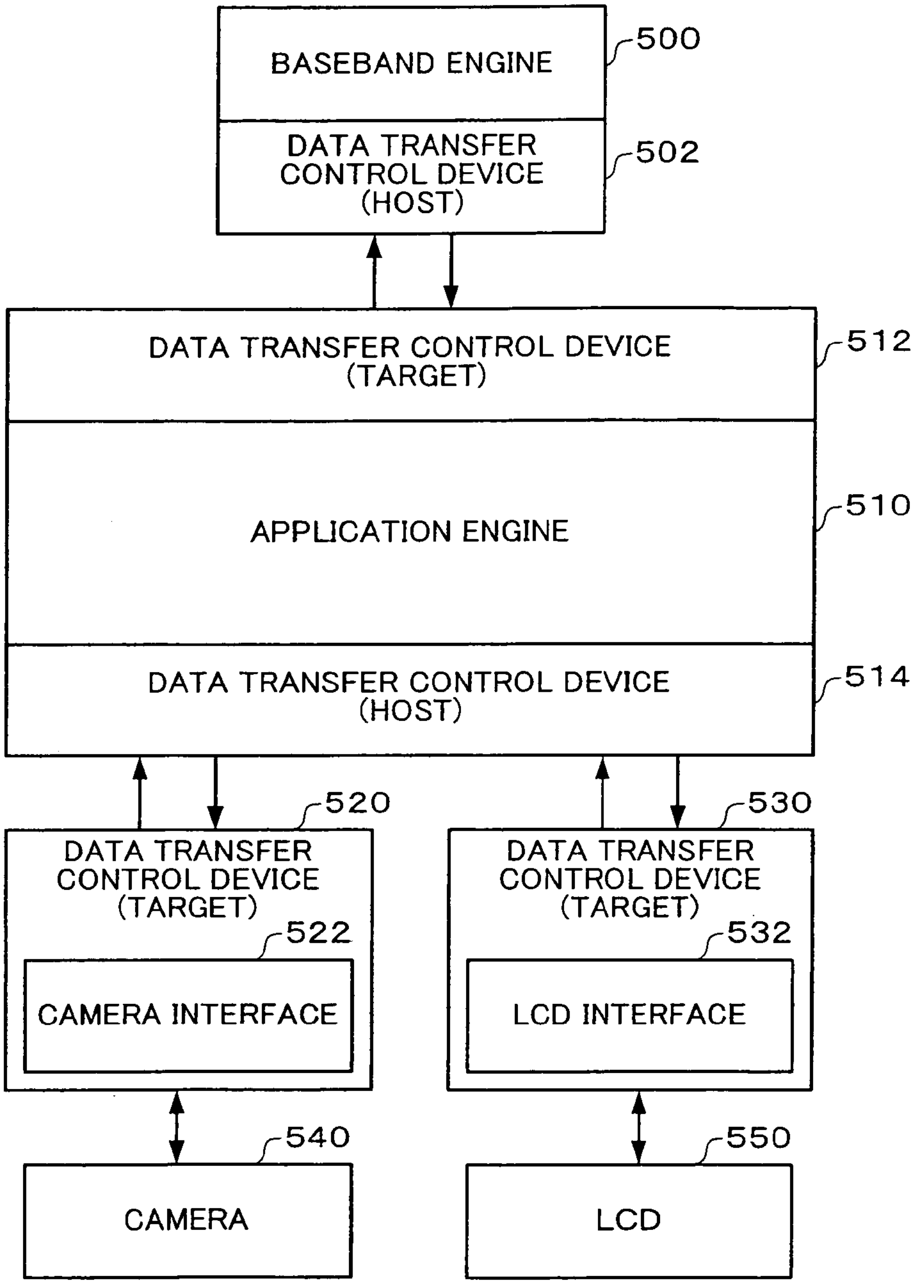
FIG. 20 shows a configuration example of an electronic instrument.

FIG. 20 shows a configuration example of an electronic instrument according to one embodiment of the invention. The electronic instrument includes data transfer control devices 502, 512, 514, 520, and 530 described in the above embodiment. The electronic instrument also includes a baseband engine 500 (communication device in a broad sense), an application engine 510 (processor in a broad sense), a camera 540 (imaging device in a broad sense), and an LCD 550 (display device in a broad sense). The electronic instrument may have a configuration in which some of these sections are omitted. According to this configuration, a portable telephone or the like having a camera function and a liquid crystal display (LCD) display function can be realized. However, the electronic instrument according to one embodiment of the invention is not limited to a portable telephone, and may be applied to various electronic instruments such as a digital camera, PDA, electronic notebook, electronic dictionary, or portable information terminal.

As shown in FIG. 20, the serial transfer described in the above embodiment is performed between the host-side data transfer control device 502 provided in the baseband engine 500 and the target side data transfer control device 512 provided in the application engine 510 (graphic engine). The serial transfer described in the above embodiment is also performed between the host-side data transfer control device 514 provided in the application engine 510 and the data transfer control device 520 including a camera interface circuit 522 or the data transfer control device 530 including an LCD interface circuit 532. The baseband engine 500 and the application engine 510 may be implemented by a single hardware device (e.g. CPU).

According to the configuration shown in FIG. 20, EMI noise can be reduced in comparison with a known electronic instrument. Moreover, power consumption of the electronic instrument can be further reduced by realizing a reduction in scale and power consumption of the data transfer control device. In the case where the electronic instrument is a portable telephone, a serial signal line can be used as a signal line passing through the connection section (hinge section) of the portable telephone, whereby mounting can be facilitated.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention. For example, any term (such as a display device or a host-side data transfer control device) cited with a different term having broader or the same meaning (such as a device or a partner device) at least once in this specification or drawings can be replaced by the different term in any place in this specification and drawings.

The configurations and the operations of the data transfer control device and the electronic instrument are not limited to the configurations and the operations described in the above embodiments. Various modifications and variations may be made. The format of each packet such as a write request packet is not limited to those described with reference to FIGS. 2A to 3B. The signal waveforms of the vertical synchronization signal, the detection signal, the interface signal, and the like are not limited to those described in the above embodiments.

What is claimed is:

1. A data transfer control device comprising:

a packet analysis circuit that analyzes a first packet transmitted to the data transfer control device, and that outputs an analysis result of the first packet;

a first packet buffer that receives the first packet;

a second packet buffer that receives a second packet transmitted to the data transfer control device after the first packet;

a switch circuit that supplies the first packet to the first packet buffer and the second packet to the second packet buffer based on the analysis result; and a packet detection circuit that receives the analysis result, analyzes an end position of the first packet or a start position of the second packet based on a data length of the first packet, and that outputs an information of the end position or the start position to the switch circuit.

2. The data transfer control device according to claim 1, further comprising:

a transaction controller that controls transfer of the first packet and the second packet.

3. An electronic instrument comprising:

the data transfer control device according to claim 2.

4. An electronic instrument comprising:

the data transfer control device according to claim 1.

5. A link controller comprising:

a packet analysis circuit that analyzes a first packet transmitted to a data transfer control device, and that outputs an analysis result of the first packet;

a first packet buffer that receives the first packet;

a second packet buffer that receives a second packet transmitted to the data transfer control device after the first packet;

a switch circuit that supplies the first packet to the first packet buffer and the second packet to the second packet buffer based on the analysis result a packet detection circuit that receives the analysis result, analyzes an end position of the first packet or a start position of the second packet based on a data length of the first packet, and that outputs an information of the end position or the start position to the switch circuit.

6. The link controller according to claim 5, further comprising:

a transaction controller that controls transfer of the first packet and the second packet.

7. An electronic instrument comprising:

the link controller according to claim 6.

8. An electronic instrument comprising:

the link controller according to claim 5.

* * * * *